(12) United States Patent
Yoshihashi

(10) Patent No.: US 10,671,333 B2
(45) Date of Patent: *Jun. 2, 2020

(54) INFORMATION PROCESSING SYSTEM, INFORMATION PROCESSING APPARATUS, AND INFORMATION PROCESSING METHOD

(71) Applicant: RICOH COMPANY, LTD., Tokyo (JP)

(72) Inventor: Ryohsuke Yoshihashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/991,300

(22) Filed: May 29, 2018

(65) Prior Publication Data

US 2018/0349078 A1 Dec. 6, 2018

(30) Foreign Application Priority Data

May 31, 2017 (JP) .................................. 2017-108694

(51) Int. Cl.
*G06F 3/12* (2006.01)
*H04L 29/08* (2006.01)
(Continued)

(52) U.S. Cl.
CPC .......... *G06F 3/1253* (2013.01); *G06F 3/1205* (2013.01); *G06F 3/1257* (2013.01); *G06F 3/1275* (2013.01); *G06F 3/1287* (2013.01); *H04L 67/16* (2013.01); *H04L 69/329* (2013.01); *G06F 3/1228* (2013.01);
(Continued)

(58) Field of Classification Search
CPC .... G06F 3/1205; G06F 3/1253; G06F 3/1275; H04L 41/0893; H04L 47/2483
See application file for complete search history.

(56) References Cited

U.S. PATENT DOCUMENTS

| | | | |
|---|---|---|---|
| 10,033,898 B2 * | 7/2018 | Han | .................... H04N 1/00464 |
| 2018/0013913 A1 | 1/2018 | Hayashi et al. | |
| 2018/0060131 A1 | 3/2018 | Namihira et al. | |

FOREIGN PATENT DOCUMENTS

JP 2014-110041 6/2014

* cited by examiner

*Primary Examiner* — Mohamed A. Wasel
(74) *Attorney, Agent, or Firm* — Oblon, McClelland, Maier & Neustadt, L.L.P.

(57) ABSTRACT

An information processing system includes one or more information processing apparatuses, a memory, and circuitry. The memory stores application information associating flow information with application configuration information for an application performs, when executed, a series of processes using electronic data. The circuitry receives, from an electronic apparatus connected to the information processing system, a first request including an application identification information identifying the application, transmits an application usage screen to the apparatus, receive a second request including a flow identification information corresponding to the application usage screen in response to execution of the series of processes with the application usage screen displayed with the apparatus, acquires, from the memory, the flow information identified by the flow identification information included in the second request, and executes the series of processes according to the flow information.

6 Claims, 23 Drawing Sheets

(51) Int. Cl.
 *H04L 12/24* (2006.01)
 *H04L 12/851* (2013.01)
(52) U.S. Cl.
 CPC ...... *H04L 41/0856* (2013.01); *H04L 41/0893* (2013.01); *H04L 47/2483* (2013.01)

FIG. 7

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

```
                                                                    ┌1100
┌──────────────────────────────────────────────────────────────────┐
│   "flowName" : "storage-files" ,  }1101                          │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  ┌1102
│    "flowDetails" : [                                            │
│  │ ┌ ─ ─ ─ ─ ─ ─ ─ ─ ─ ─ ─ ─ ─ ─ ─ ─ ─ ─ ─ ─ ─ ─ ─ ─ ─ ─ ─ ┐ │
│    │ {                                            ├──1110      │
│  │   "detailName" : " detail0" ,                  │         │ │
│    │ "componetName" : "storage" ,                           │
│  │   "operationName" : "getFilelist" ,                      │ │
│    │ "parameters" : {                                       │
│  │      ...                                                 │ │
│    │ }                                                      │
│  │ }                                                        │ │
│    └ ─ ─ ─ ─ ─ ─ ─ ─ ─ ─ ─ ─ ─ ─ ─ ─ ─ ─ ─ ─ ─ ─ ─ ─ ─ ─ ─ ┘
│  │ ]                                                          │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
└──────────────────────────────────────────────────────────────────┘
```

FIG. 8B

```
                                                                    ┌1100
┌──────────────────────────────────────────────────────────────────┐
│   "flowName" : "storage-download" ,}1101                         │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  ┌1102
│    "flowDetails" : [                                            │
│  │ ┌ ─ ─ ─ ─ ─ ─ ─ ─ ─ ─ ─ ─ ─ ─ ─ ─ ─ ─ ─ ─ ─ ─ ─ ─ ─ ─ ─ ┐ │
│    │ {                                            ├──1110      │
│  │   "detailName" : "detail0" ,                   │         │ │
│    │ "componetName" : "storage" ,                           │
│  │   "operationName" : "downloadFile" ,                     │ │
│    │ "parameters" : {                                       │
│  │      ...                                                 │ │
│    │ }                                                      │
│  │ }                                                        │ │
│    └ ─ ─ ─ ─ ─ ─ ─ ─ ─ ─ ─ ─ ─ ─ ─ ─ ─ ─ ─ ─ ─ ─ ─ ─ ─ ─ ─ ┘
│  │ ]                                                          │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
└──────────────────────────────────────────────────────────────────┘
```

FIG. 9

| LAYOUT NAME | INPUT FORMAT |
|---|---|
| one-column-list | list |
| two-column-list | list |
| ... | ... |
| preview | file |
| ... | ... |

} LAYOUT INFORMATION

```
"componentName" : "storage" , }5001
"operations" : [
    {
        "operationName" : "getFileList" ,
        "outputFormat" : "list" ,
        "parameters " : {
            ...
        }
    },
    {
        "operationName" : "downloadFile" ,
        "outputFormat" : "file" ,
        "parameters" : {
            ...
        }
    },
    ...
]
```

5000, 5001, 5002, 5010, 5020

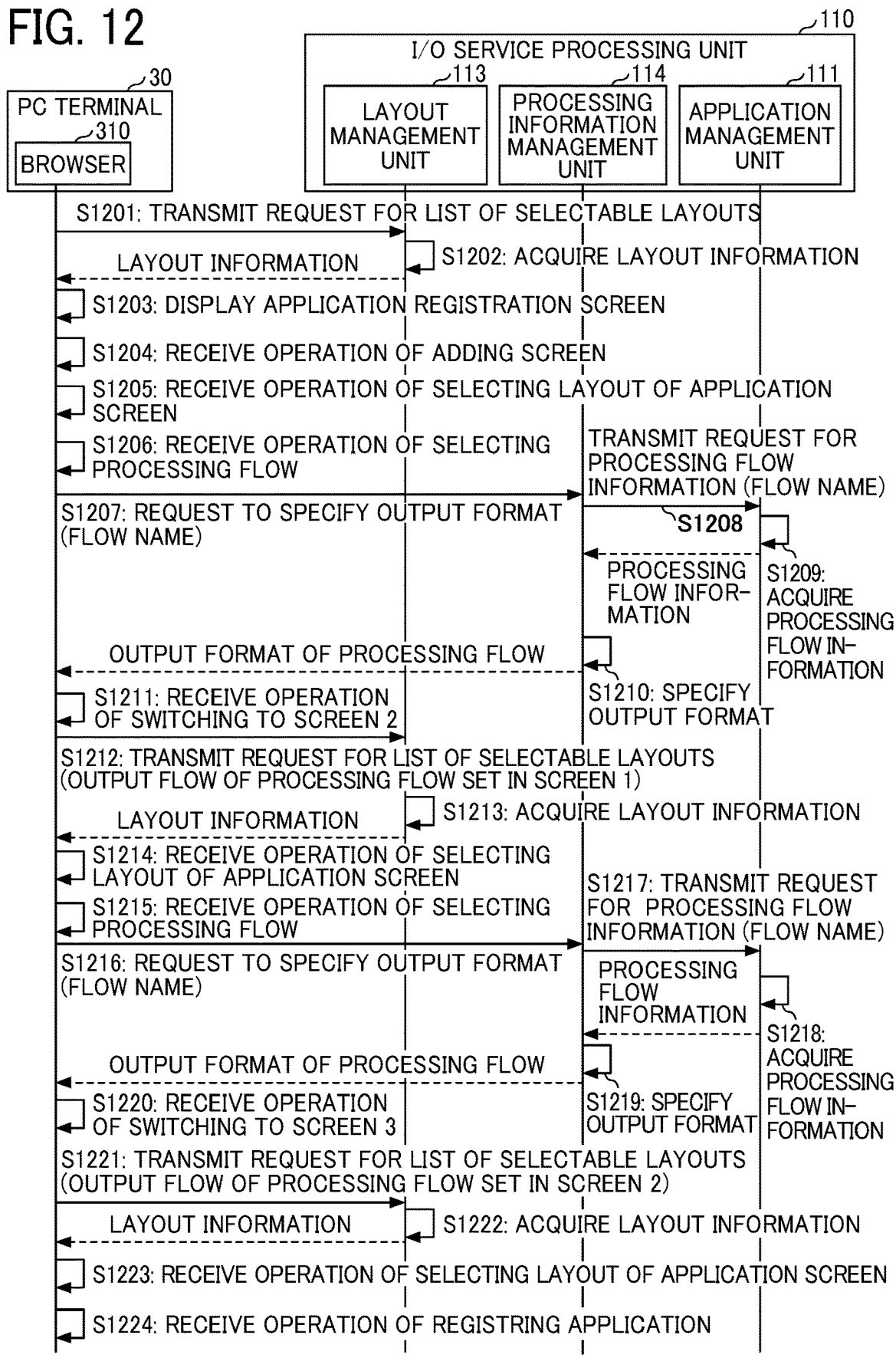

FIG. 16

```
"app_type" : "print" , }1201
"appName" : "EXTERNAL FILE PRINT APPLICATION" , }1202
...                                                                1203
"views" : [
    {                                                          ~~1210
        "name" : "view1" ,
        "layoutName" : "select-folder" ,
        "flowName" : "storage-files" ,
        "defaultParameters" :
        ...
        },
        "userInputParameters" : {
        ...
        }
    },
    {                                                          ~~1220
        "name" : "view2" ,
        "layoutName" : "one-column-list" ,
        "flowName" : "storage-download" ,
        "defaultParameters" : {
        ...
        },
        "userInputParameters" : {
        ...
        }
    },
    {                                                          ~~1230
        "name" : "view3" ,
        "layoutName" : "preview" ,
        "flowName" : null,
    }
]
```

1200

INFORMATION PROCESSING SYSTEM, INFORMATION PROCESSING APPARATUS, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2017-108694, filed on May 31, 2017, in the Japan Patent Office, the entire disclosure of which is hereby incorporated by reference herein.

BACKGROUND

Technical Field

The present disclosure relates to an information processing system, an information processing apparatus, and an information processing method.

Related Art

In recent years, a service for providing a function in which a plurality of functions (for example, scanning, printing, a mail delivering, etc.) are combined is known. For example, a service of delivering via mail an electronic file (image file) after predetermined processing is performed on the electronic file generated by scanning is known. Such a service is provided by executing one or more processes for implementing each function are performed as a series of processes.

SUMMARY

Example embodiments of the present disclosure includes an information processing system including one or more information processing apparatuses each of which is configured to perform a plurality of programs to implement functions. The information processing system includes a memory and circuitry.

The memory stores application information associating flow information with application configuration information for corresponding one of one or more applications each of which performs, when executed, a series of processes using electronic data. The flow information defines program identification information identifying one or more programs each of which is executed to perform a process included in the series of processes, and an order of execution of the one or more programs. The application configuration information defines flow identification information identifying the corresponding flow information, and is associated with application screen information indicating one or more application usage screens used to perform the series of processes based on the flow information identified by the flow identification information.

The circuitry receives, from one of a plurality of electronic apparatuses connected to the information processing system, a first request including application identification information identifying one of the plurality of applications stored in the memory. The circuitry transmits one or more application usage screens to the one of the plurality of electronic apparatuses. The one or more application usage screens are corresponding to the application screen information indicating one or more application usage screens that is defined in the application configuration information on the application identified by the application identification information included in the first request received. The circuitry receives a second request including the flow identification information corresponding to the application usage screen in response to execution of the series of processes on the application usage screen displayed by the one of the plurality of electronic apparatuses, acquires, from the memory, the flow information identified by the flow identification information included in the second request received, and executes the series of processes in which the one or more programs identified by the program identification information defined in the acquired flow information are executed in the order of execution defined in the flow information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a table illustrating an example of a type-conversion information table according to the exemplary embodiment;

FIGS. 8A and 8B are illustrations of examples of processing flow information according to the exemplary embodiment;

FIG. 9 is an illustration of an example of layout information according to the exemplary embodiment;

FIG. 10 is an illustration of example of component list information according to the exemplary embodiment;

FIG. 12 is a sequence diagram illustrating example steps in operation of setting an application screen and a processing flow of an external file printing application according to the exemplary embodiment;

FIG. 16 is an illustration of an example of application configuration information according to the exemplary embodiment;

Figure 1:
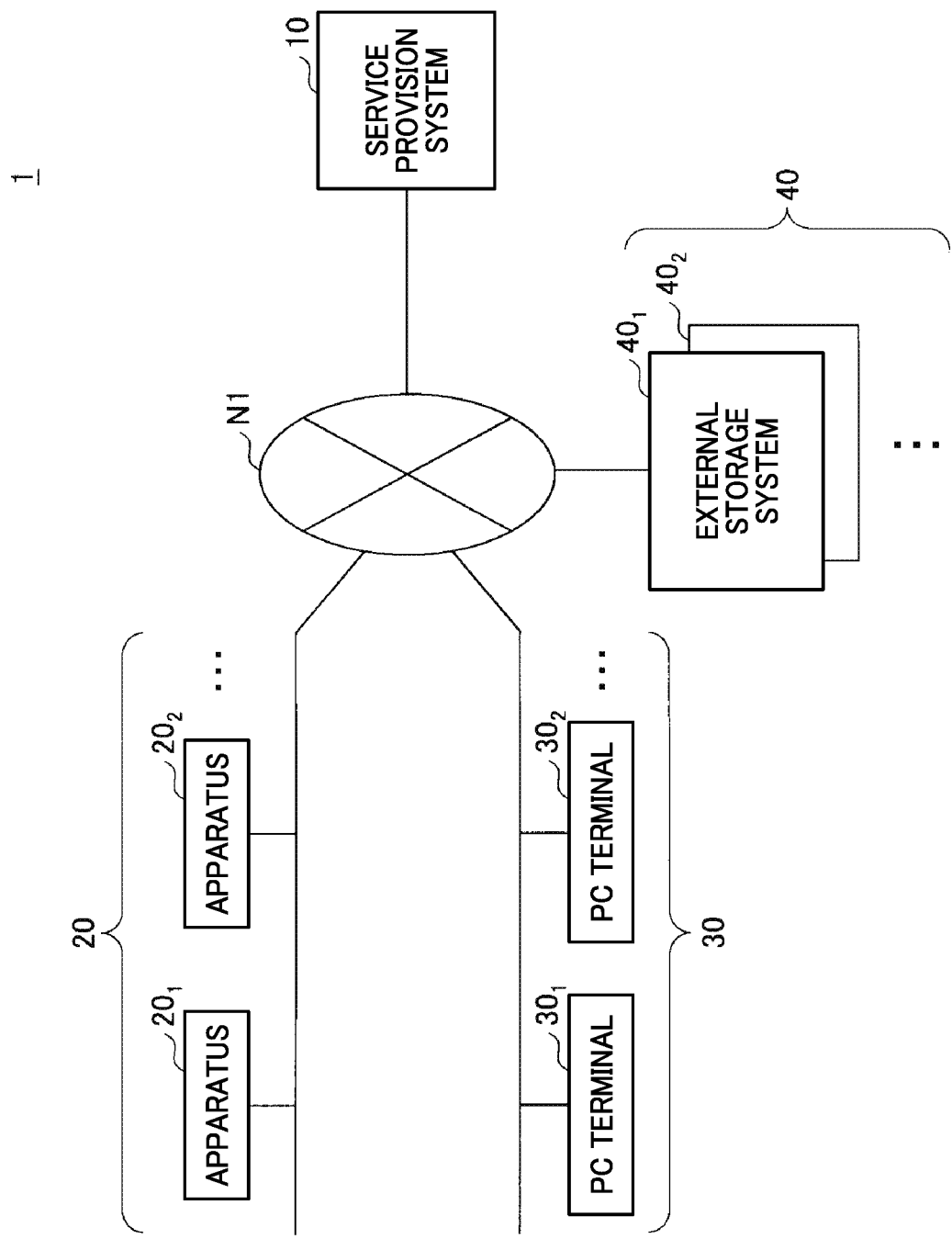
FIG. 1 is a diagram illustrating an example of a system configuration of the information processing system according to an exemplary embodiment.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of several embodiments of the present disclosure with reference to drawings.

<System Configuration>

An information processing system 1 according to a present embodiment is described below with reference to FIG. 1. FIG. 1 is a diagram illustrating an example of a system configuration of the information processing system 1 according to the present embodiment.

As illustrated in FIG. 1, the information processing system 1 includes a service provision system 10, an apparatus 20, a personal computer (PC) terminal 30, and an external storage system 40, which are communicably connected to each other through a wide area network N1 such as the Internet.

The service provision system 10 includes one or more information processing apparatuses and provides services by performing a series of processes in cooperation with an external service such as a cloud service through the wide area network N1 such as the Internet.

Specific examples of the services provided by the service provision system 10 according to the present embodiment are deferred. In the following description of the present embodiment, the series of processes may be referred to as a "processing flow".

In the following description of the present embodiment, a cloud service is used as one of the specific examples of the external services, however, though the external service is not limited to a cloud service. The present embodiment may be used in relation to other various external services, for example, a service provided by an application service provider (ASP) and a web service, which are provided via a network.

The apparatus 20 is an example of an electronic apparatus used by a user. The apparatus 20 includes, for example, an image forming apparatus such as a multifunction peripheral (MFP), a PC, a projector, an electronic whiteboard, and a digital camera. The user uses the various services provided by the service provision system 10 with the apparatus 20.

In the following description, an index is used, in a case where the plurality of apparatuses 20 is distinguished from each other, as follows: "apparatus $20_1$", "apparatus $20_2$" . . . .

The PC terminal 30 includes, for example, a desktop PC, a note type PC, a smartphone, and a tablet terminal, each of which is used by a user. The user uses the various services provided by the service provision system 10 with the PC terminal 30.

In the following description, index is used, in a case where the plurality of terminal PCs 30 is distinguished from each other, as follows: "PC terminal $30_1$", "PC terminal $30_2$" . . . .

The external storage system 40 is a computer system that provides a cloud service called as a storage service (or an online storage) through the network N1. The storage service is a service that provides a storage area of storage of the external storage system 40.

In the following description, index is used, in a case where the plurality of external storage systems 40 is distinguished from each other, as follows: "external storage system $40_1$", "external storage system $40_2$" . . . . Additionally, the storage services provided by the external storage system $40_1$, the external storage system $40_2$ . . . are referred to as a "storage A", a "storage B" . . . , respectively, in the following description.

In one or more embodiments, the external storage system 40 may be implemented with a plurality of information processing apparatuses.

The configuration of the information processing system 1 as illustrated in FIG. 1 is one example, and the information processing system 1 may have another alternative configuration. For example, the information processing system 1 according to the present embodiment includes various types of apparatuses each of which performs at least one of inputting electronic data and outputting electronic data. These apparatuses may use the various services provided by the service provision system 10.

<Hardware Configuration>

Figure 2:
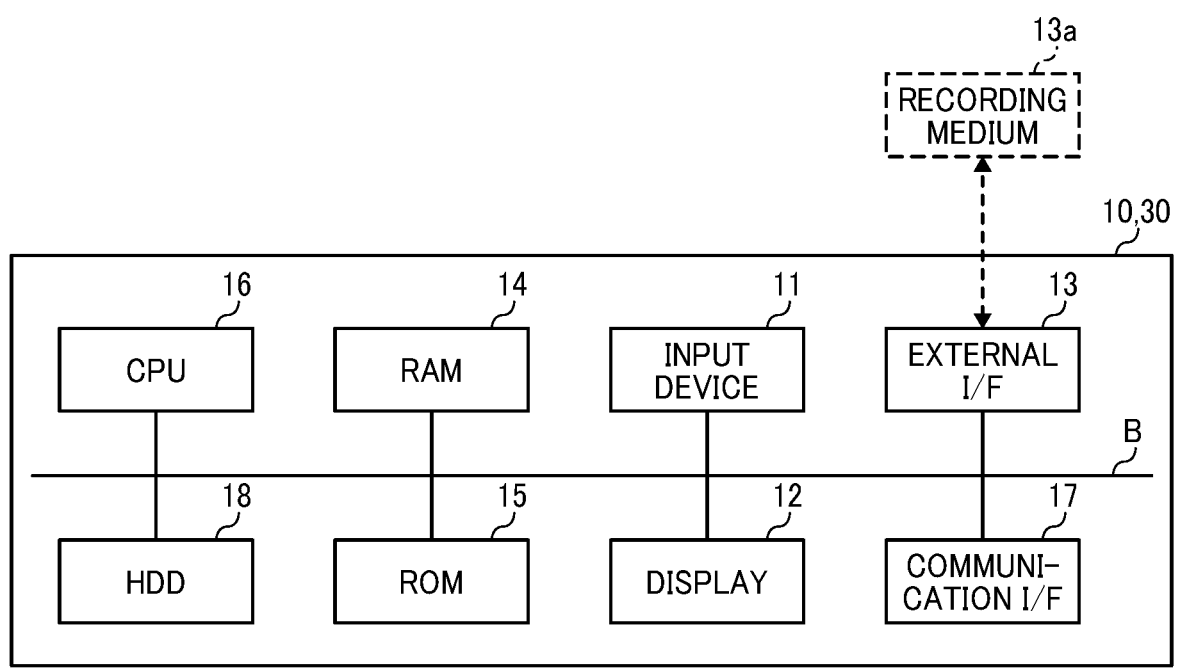
FIG. 2 is a block diagram illustrating an example hardware configuration of any one of a service provision system and a PC terminal according to the exemplary embodiment.

A hardware configuration of each of the service provision system 10 and the PC terminal 30 included in the information processing system 1 according to the present embodiment is described below with reference to FIG. 2. FIG. 2 is a block diagram illustrating an example hardware configuration of each of the service provision system 10 and the PC terminal 30 according to the present embodiment. The hardware configuration of the service provision system 10 is the same as or a similar to that of the PC terminal 30 and, accordingly, the service provision system 10 is mainly used to describe the hardware configuration in the following description.

As illustrated in FIG. 2, the service provision system 10 includes an input device 11, a display 12, an external interface (I/F) 13, and a random access memory (RAM) 14. The service provision system 10 further includes a read only memory (ROM) 15, a central processing unit (CPU) 16, a communication I/F 17, and a hard disk drive (HDD) 18. The above-mentioned hardware components are connected to each other through a bus B.

The input device 11 includes at least one of a keyboard, a mouse, a touch panel, and the like, and is used to input various operation signals by the user. The display 12 includes a liquid crystal display (LCD) and displays a processing result of the service provision system 10. There may be a configuration in which at least one of the input device 11 and the display 12 is connected to the service provision system 10 for being used when necessary.

The communication I/F 17 is an interface that connects the service provision system 10 to the network N1. With the configuration described above, the service provision system 10 performs data communication via the communication I/F 17.

The HDD 18 is a nonvolatile storage device that stores programs or data. Examples of the programs or the data stored in the HDD 18 include an operating system (OS), which is basic software used for controlling overall operation of the service provision system 10, and application software providing various functions on the OS.

In one or more embodiments, the service provision system 10 includes, instead of or in addition to the HDD 18, a drive device such as a solid state drive (SSD), which uses a flash memory as a recording medium. The HDD 18 manages the programs or the data by a predetermined file system and/or a predetermined database.

The external I/F 13 is an interface that connects the service provision system 10 with an external device. An example of the external device includes a recording medium 13*a*. With this configuration, the service provision system 10 reads from and/or writes to the recording medium 13*a* via the external I/F 13. Examples of the recording medium 13*a* include a flexible disc, a compact disc (CD), a digital versatile disc (DVD), a secure digital (SD) memory card, and a universal serial bus (USB) memory.

The ROM 15 is a nonvolatile semiconductor memory that stores programs or data even after the service provision system 10 is turned off and when the power is not supplied. The ROM 15 stores programs or data such as a basic input output system (BIOS), which is executed when the service provision system 10 starts up, an OS configuration, and/or a network configuration. The RAM 14 is a volatile semiconductor memory that temporarily stores programs or data.

The CPU 16 reads programs or data from a storage device such as the ROM 15 and the HDD 18 onto the RAM 14, and executes processing to control the service provision system 10 and implement functions of the service provision system 10.

With the hardware configuration as illustrated in FIG. 2, each of the service provision system 10 and the PC terminal 30 according to the present embodiment executes various types of processing as described later.

Figure 3:
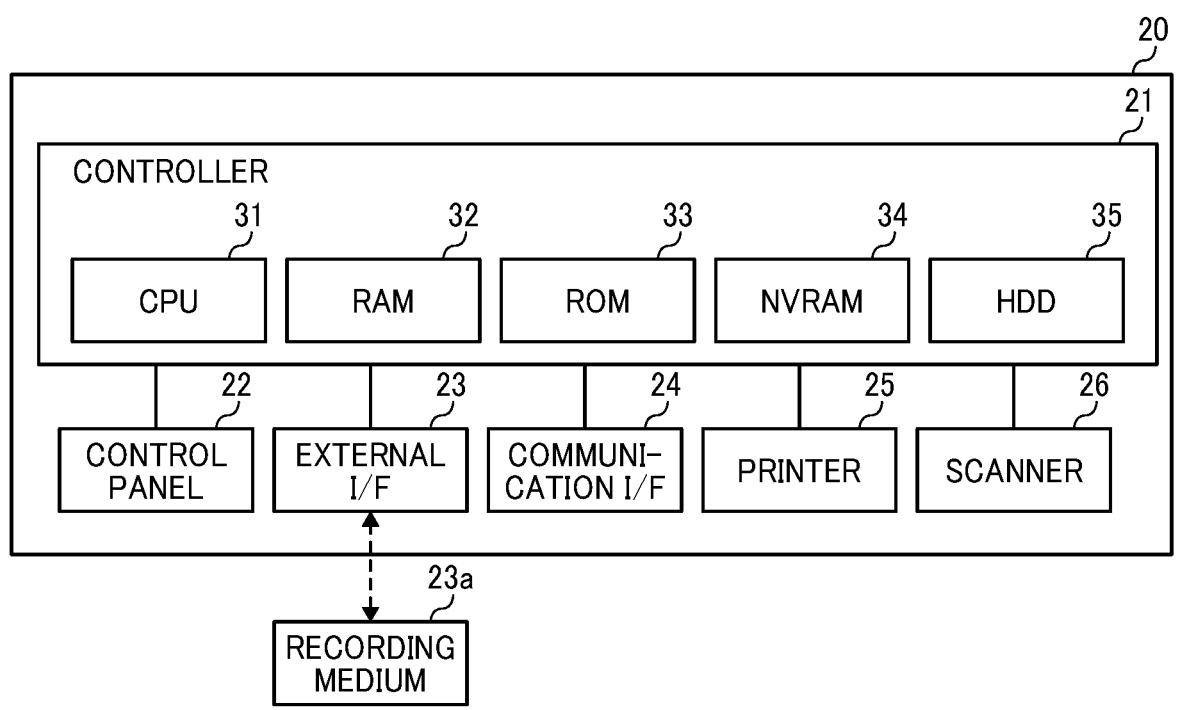
FIG. 3 is a diagram illustrating an example of a hardware configuration of an apparatus according to the exemplary embodiment.

A hardware configuration of the apparatus 20, which is an image forming apparatus in the present embodiment, included in the information processing system 1 according to the present embodiment is described below with reference to FIG. 3. FIG. 3 is a diagram illustrating an example of the hardware configuration of the apparatus 20 according to the present embodiment.

As illustrated in FIG. 3, the apparatus 20 includes a controller 21, a control panel 22, an external interface (I/F) 23, a communication interface (I/F) 24, a printer 25, and a scanner 26. The controller 21 includes a CPU 31, a RAM 32, a ROM 33, a non-volatile random access memory (NVRAM) 34, and an HDD 35.

The ROM 33 is a nonvolatile semiconductor memory that stores various programs or data. The RAM 32 is a volatile semiconductor memory, which temporarily stores programs or data. The NVRAM 34 stores configuration information, for example. The HDD 35 is a nonvolatile storage device that stores various programs or data.

The CPU 31 is a processing device that reads programs or data from the ROM 33, the NVRAM 34, the HDD 35, etc., onto the RAM 32 and executes processing to control the apparatus 20 and implement functions of the apparatus 20.

The control panel 22 includes an input unit that receives a user input and a display unit that displays various information. The external I/F 23 is an interface that connects the apparatus 20 to an external device. Examples of the external device include a recording medium 23*a*. The external I/F 23 enables the apparatus 20 to read and/or write data from and/or to the recording medium 23*a*. Examples of the recording medium 23*a* include an integrated circuit (IC) card, a flexible disc, a CD, a DVD, a SD memory card, and a USB memory.

The communication I/F 24 is an interface that connects the apparatus 20 to a network. The apparatus 20 performs data communication via the communication I/F 24. The printer 25 is a printing device that performs printing according to print data. The scanner 26 is a reading device that scans a document to generate an electronic file (image file).

With the hardware configuration as illustrated in FIG. 3, the apparatus 20 according to the present embodiment implements various types of processing as described later.

<Service Provided by Service Provision System>

An example of the service provided by the service provision system 10 according to the present embodiment is described below. In the following description, an image forming apparatus is used as the apparatus 20.

In the present embodiment, an "external file printing service" is defined as a service of downloading and printing, with the apparatus 20, a file selected from a list of files (file list) acquired from the external storage system 40 where the list of files is stored. In the description of the embodiment, the service provision system 10 provides the external file printing service.

To provide the external file printing service, the service provision system 10 is required to register an application (application information 1000, which is described later) that enables the apparatus 20 to use the external file printing service.

In the following, a description of registration of the application for using the external file printing service (hereinafter, referred to as an "external file printing application") by the PC terminal 30 and a description of use of the external file printing service by the apparatus 20 are given.

Figure 4:
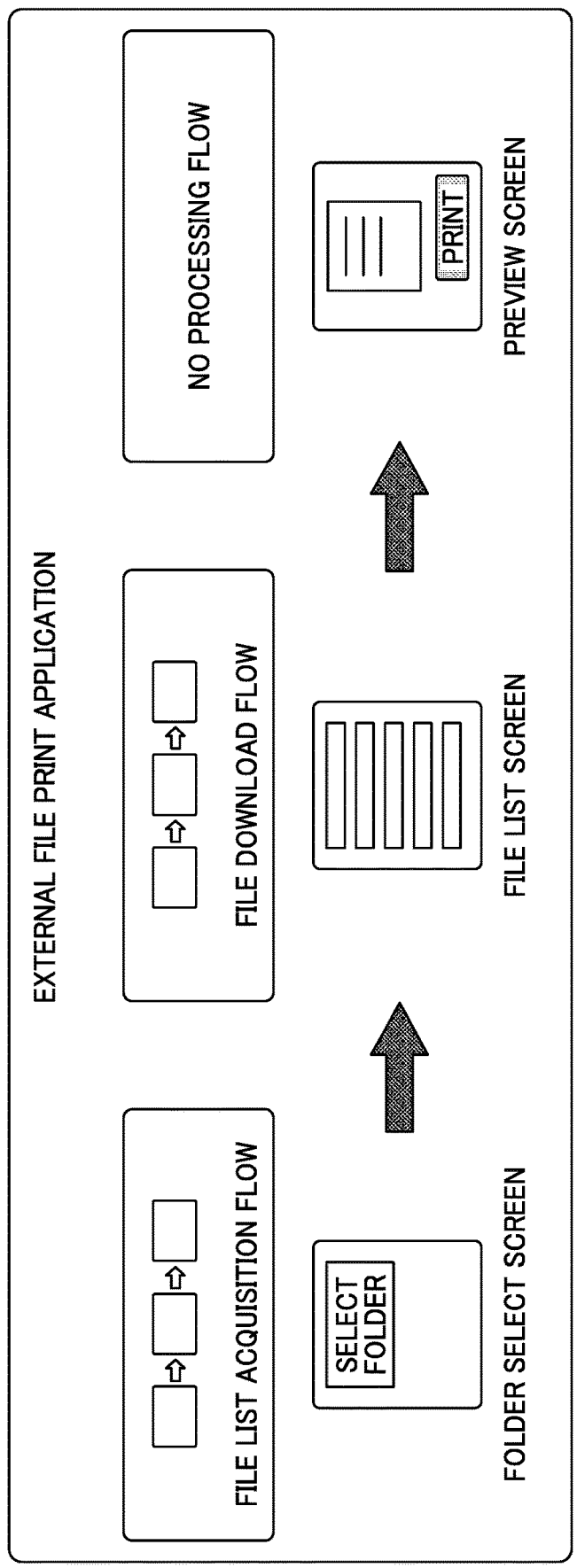
FIG. 4 is a schematic block diagram for explaining an external file printing application according to the exemplary embodiment.

As illustrated in FIG. 4, the external file printing application according to the present embodiment includes one or more screens and one or more processing flows.

That is, the external file printing application associates a folder select screen that is used by the user to select a folder with a processing flow (file list acquisition flow) for acquiring a list of files stored in the selected folder. Additionally, the external file printing application associates a file list screen displaying the list of files acquired by the file list acquisition flow with a processing flow (file download flow) for downloading a file selected on the file list screen. The external file printing application further includes a preview screen to display a preview of the file downloaded by the file download flow. The user prints out the file displayed on the preview screen, using the apparatus 20. The preview screen is not associated with any processing flow.

As described above, the application registered in the service provision system 10 is capable of including one or more screens as well as the processing flows each of which may be executed using one of the screens.

The service provided by the service provision system 10 is not limited to the external file printing service. The service provision system 10 may provide a mail delivering service with which the apparatus 20 scans a document to generate an electronic file, encrypts the electronic file, and then sends the encrypted electronic file by an electronic mail.

Similarly, the service provision system 10 may provide a faxing service with which the apparatus 20 scans a document to generate an electronic file, adds predetermined information to the electronic file, and then faxes the electronic file.

<Functional Configuration>

Figure 5:
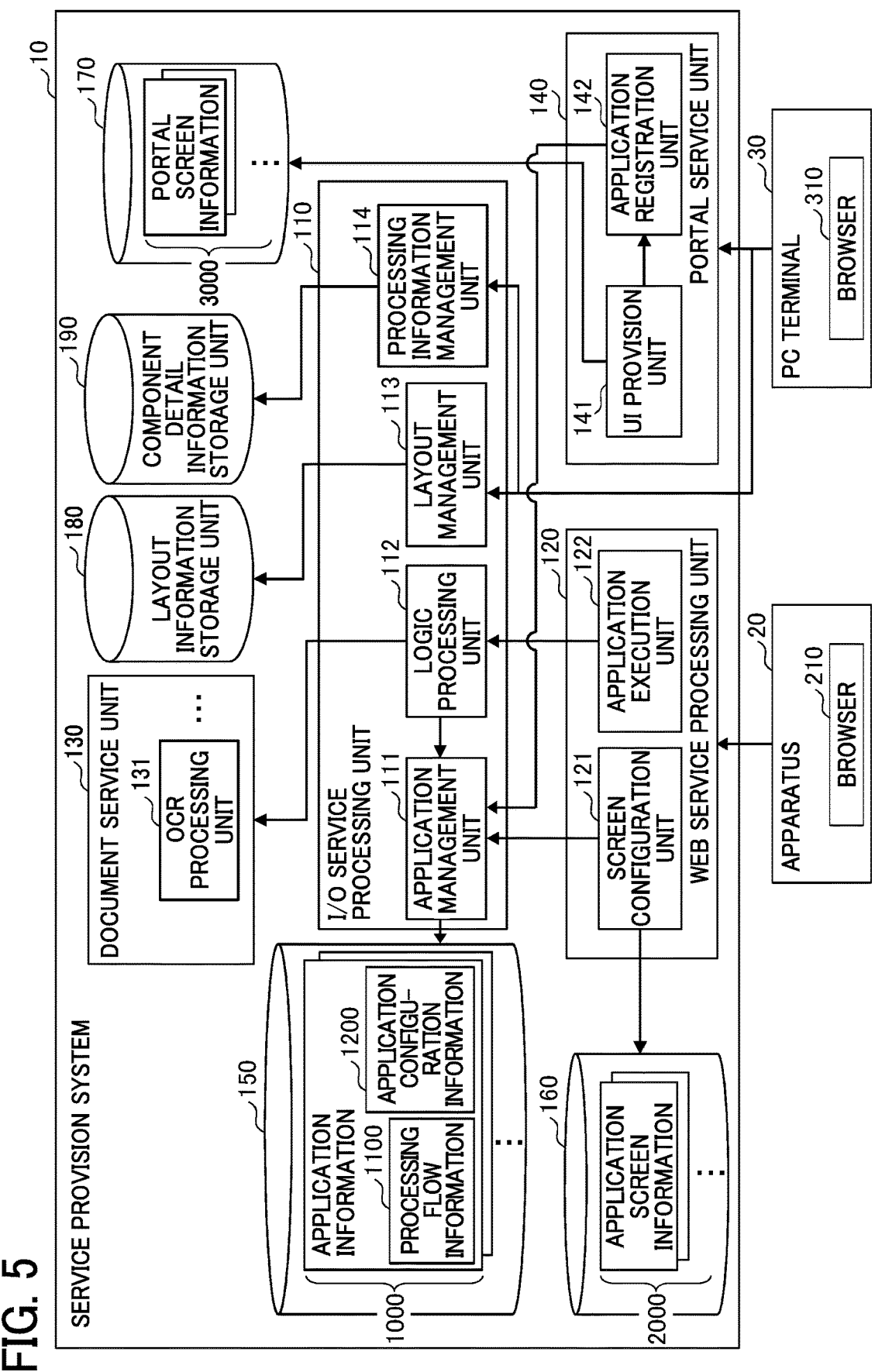
FIG. 5 is a diagram illustrating an example functional configuration of the information processing system according to the exemplary embodiment.

A description is given below of a functional configuration of the information processing system 1 according to the present embodiment with reference to FIG. 5. FIG. 5 is a diagram illustrating an example of the information processing system 1 according to the present embodiment.

The PC terminal 30 illustrated in FIG. 5 includes a browser 310 executed by, for example, the CPU 16. The browser 310 allows the user of the PC terminal 30 to register, to the service provision system 10, the applications for using the various services including the "external file printing service".

The apparatus 20 illustrate in FIG. 5 includes a browser 210 executed by, for example, the CPU 31. The browser 210 allows the user of the apparatus 20 to use the various services including the "external file printing service". That is, the apparatus 20 is required to include the browser 210 to use such services, which, here, means that the apparatus 20 is not required to include a dedicated application program for utilizing each service provided by the service provision system 10.

As illustrated in FIG. 5, the service provision system 10 includes an input/output (I/O) service processing unit 110, a web service processing unit 120, a document service unit 130, and a portal service unit 140. Each of the above-mentioned functional units is implemented by executing, with the CPU 16 of the service provision system 10, one or more programs installed in the service provision system 10.

The service provision system 10 further includes an application information storage unit 150, an application screen information storage unit 160, a portal screen information storage unit 170, a layout information storage unit 180, and a component detail information storage unit 190. Each of the above-mentioned storage units is implementable with, for example, the HDD 18. Alternatively, at least one of the above-mentioned storage units may be implemented with a storage device connected to the service provision system 10 through a network.

The I/O service processing unit 110 executes processing related to the service provided by the service provision system 10. The I/O service processing unit 110 includes an application management unit 111, a logic processing unit 112, a layout management unit 113, and a processing information management unit 114.

The application management unit 111 manages application information 1000 stored in the application information storage unit 150. The application information 1000 is the application for using the service provided by executing the series of processes. In other words, each of the services, which is provided by the service provision system 10, is provided by the application information 1000.

The application management unit 111 also transmits, to the logic processing unit 112 in response to a request from the logic processing unit 112, processing flow information 1100 included in the application information 1000. The processing flow information 1100 defines the series of processes that implements the service provided by the application information 1000. A detail description of the processing flow information 1100 is deferred.

The application management unit 111 causes the application information storage unit 150 to store the application information 1000 in response to a request from the portal service unit 140. Accordingly, the application information 1000 (application) providing the service is registered in the service provision system 10.

The logic processing unit 112 acquires the processing flow information 1100 included in the application information 1000 from the application management unit 111 in response to a request from the web service processing unit 120. The logic processing unit 112 executes the series of the processes (processing flow) for the service provided by the application information 1000 based on the processing flow information 1100 obtained from the application management unit 111. Accordingly, the service provision system 10 according to the present embodiment provides each of the various services including the "external file printing service". A detailed description of the logic processing unit 112 is deferred.

The layout management unit 113 manages layout information stored in the layout information storage unit 180. The layout information is information related to a screen (application screen) for using the service provided based on the application information 1000. A detailed description of the layout information is deferred.

The layout management unit 113 acquires the layout information that is selectable by the user from the layout information storage unit 180 in response to a request from the browser 310 when the user registers the application.

The processing information management unit 114 manages component detail information 5000 stored in the component detail information storage unit 190. The component detail information 5000 is information related to a component that is for executing each process included in the processing flow. A detailed description of the component detail information 5000 is deferred.

The processing information management unit 114 also specifies an output format of the processing flow information 1100 selected by the user by referring to the component detail information 5000 stored in the component detail information storage unit 190. The output format is a data format of a processing result, which is output by the series of processes based on the processing flow information 1100. The output format includes, for example, "list", which indicates a list of data such as file list, and "file", which indicates an electronic file.

The web service processing unit 120 performs processing so that the user of the apparatus 20 uses each of the various services with the browser 210. That is, the web service processing unit 120 serves as an application server providing the browser 210 with the web application (application information 1000). The web service processing unit 120 includes a screen configuration unit 121 and an application execution unit 122.

In response to a request from the browser 210, the screen configuration unit 121 transmits application screen information 2000 stored in the application screen information storage unit 160 and application configuration information 1200 stored in the application information storage unit 150.

The application screen information 2000 is information defining a format of a screen (application screen) for using the service provided by the application information 1000. For example, the application screen information 2000 defines the format of the application screen using hypertext markup language (HTML), extensible hypertext markup language (XHTML), cascading style sheets (CSS), or Java Script (registered trademark).

The application configuration information 1200 is information defining various settings of the application (application information 1000). For example, in the application configuration information 1200, parameter information indicating a parameter value input by the user and parameter information indicating a default parameter value, which are used for execution of the series of processes, are defined. Additionally, in the application configuration information 1200, input items for the user to input the parameter information with the application screen and display information (e.g., application name) related to the application screen are defined, for example. The application configuration information 1200 is information defining various settings of the application with JavaScript Object Natation (JSON), for example.

With the above-described configuration, the apparatus 20 displays, using the browser 210, the application screen for using the service provided by the service provision system 10.

In response to a request to execute the application (application information 1000) from the browser 210, the application execution unit 122 transmits to the I/O service processing unit 110 the request to execute the application (application information 1000).

The document service unit 130 executes a predetermined processing included in the series of processes (processing flow) according to the processing flow information 1100. The document service unit 130 includes an optical character recognition (OCR) processing unit 131.

The OCR processing unit 131 performs OCR processing on an electronic file and generates a portable document format (PDF) file to which text recognized in the OCR processing is given.

The document service unit 130 may further include other various functional units such as a compression/decompression unit configured to compress and/or decompress an electronic file and a file format conversion unit configured to convert a file format of an electronic file.

The portal service unit 140 performs processing so that the user registers the application using the browser 310 of the PC terminal 30. The portal service unit 140 includes a user interface (UI) provision unit 141 and an application registration unit 142.

In response to a request from the browser 310, the UI provision unit 141 transmits portal screen information 3000 stored in the portal screen information storage unit 170. Here, a portal is defined as a web site capable of registering an application using the browser 310.

The portal screen information 3000 is information with which various screens of the portal, such as a portal top screen and an application registration screen, are defined. The portal screen information 3000 defines the various screens using HTML, extensible markup language (XML), CSS, and JavaScript, for example.

With the above-described configuration, the PC terminal 30 displays the application registration screen, etc. using the browser 310. Accordingly, the user of the PC terminal 30 performs the registration operation to register the application (application information 1000) through the application registration screen.

The application registration unit 142 requests the application management unit 111 to register the application (application information 1000) in response to a request from the UI provision unit 141. That is, the application registration unit 142 transmits the request to the application management unit 111 when the registration operation is performed.

The application information storage unit 150 stores the application information 1000. The application information 1000 is stored in the application information storage unit 150 in association with an application identification (ID) identifying the application information 1000. The application ID is, for example, a uniform resource locator (URL) of the application information 1000 or identification information included in the URL of the application information 1000.

The application information 1000 includes one or more pieces of the processing flow information 1100 and one or more pieces of the application configuration information 1200.

For example, the application information 1000, which provides the external file printing service (external file printing application), includes the processing flow information 1100 defining the file list acquisition flow and the processing flow information 1100 defining the file download flow. Additionally, the application information 1000 providing the external file printing service includes the application configuration information 1200 in which the various settings of the application information 1000 are defined.

The application configuration information 1200 included in the application information 1000 may be corresponding to more than two applications, namely more than two pieces of the application configuration information 1200 each of which corresponds to an application.

As described above, the processing flow information 1100 is information in which a series of processes for implementing the service provided by the application information 1000 is defined. A detail description of the processing flow information 1100 is deferred.

Additionally, the application configuration information 1200 is information defining the various settings of the application (application information 1000) as described above. A detail description of the application configuration information 1200 is deferred.

The application screen information storage unit 160 stores the application screen information 2000. The application screen information 2000 is stored in the application screen information storage unit 160 in association with an application identification (ID). Additionally, in the application screen information storage unit 160, a single application ID is associated with the application screen information 2000 indicating one or more application screens. For example, the application ID identifying the external file printing application is associated with the application screen information 2000 on the folder select screen, the application screen information 2000 on the file list screen, and the application screen information 2000 on the preview screen.

The portal screen information storage unit 170 stores the portal screen information 3000. The portal screen information 3000 is stored in the portal screen information storage unit 170 in association with the URL of the application registration screen, etc.

The layout information storage unit 180 stores the layout information. The component detail information storage unit 190 stores the component detail information 5000.

Each of I/O service processing unit 110, the web service processing unit 120, the document service unit 130, and the portal service unit 140 may be implemented in a different information processing apparatus.

Figure 6:
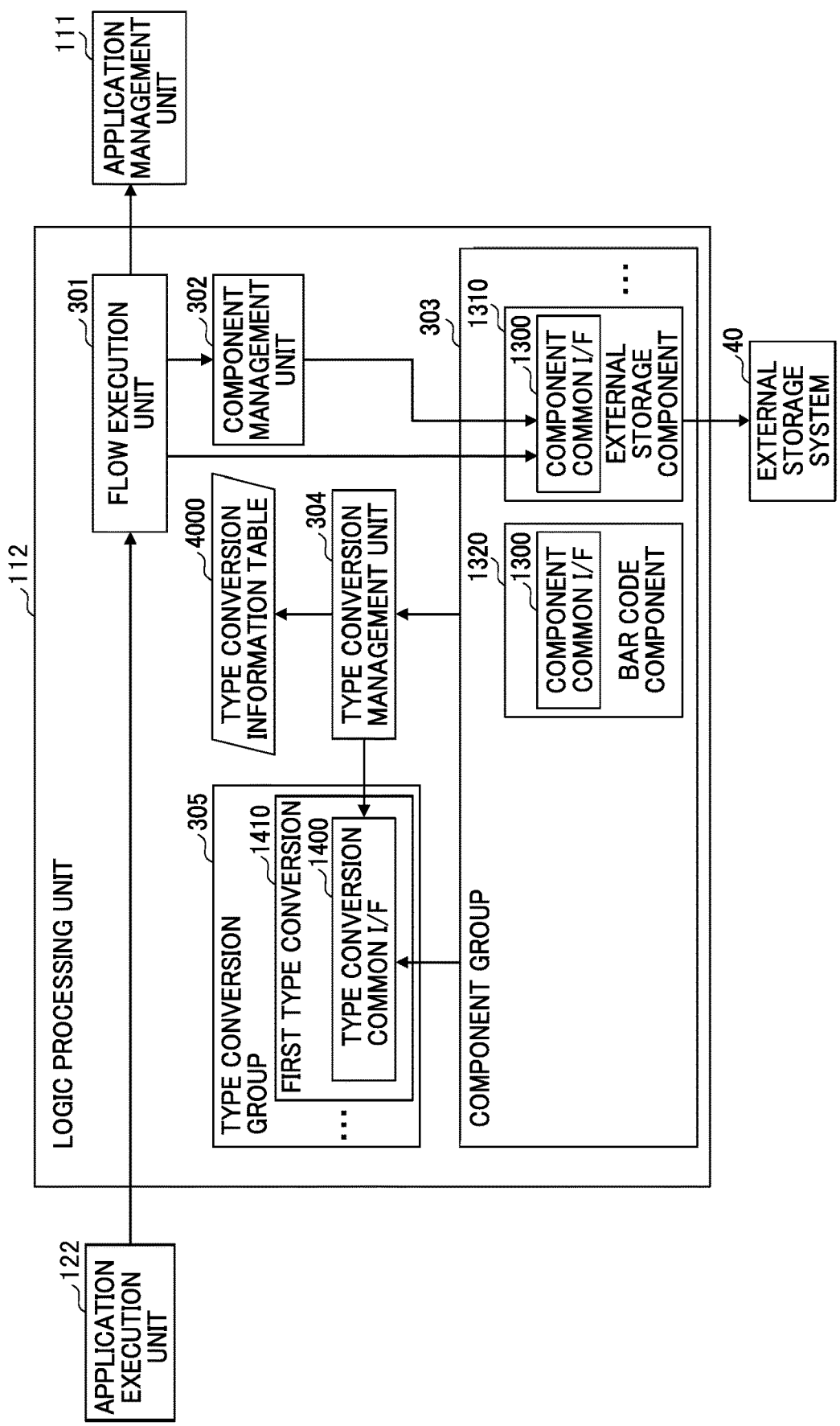
FIG. 6 is a block diagram illustrating an example functional configuration of a logic processing unit according to the exemplary embodiment.

A detailed description is given below of a functional configuration of the logic processing unit 112 with reference to FIG. 6. FIG. 6 is a block diagram illustrating an example functional configuration of the logic processing unit 112 according to the present embodiment.

As illustrated in FIG. 6, the logic processing unit 112 includes a flow execution unit 301, a component management unit 302, a component group 303, a type conversion management unit 304, and a type conversion group 305.

Upon receiving the request to execute the application request from the application execution unit 122, the flow execution unit 301 acquires, from the application management unit 111, the processing flow information 1100 corresponding to the request. Subsequently, the flow execution unit 301 executes the series of processes (processing flow) based on the processing flow information 1100 acquired from the application management unit 111.

The series of processes based on the processing flow information 1100 is executed by combining components each of which is used for executing each process included in the series of processes. Each component is implemented by a program, a module, or the like that provides a predetermined function, and defined as, for example, a class or a function.

The component management unit 302 manages the components. The component management unit 302 generates a component in response to a request from the flow execution unit 301 and transmits the generated component to the flow execution unit 301. Generating the component means expanding the component, which is defined as, for example, a class or a function, to a memory such as the RAM 14.

The component group 303 is a set of components. The component group 303 includes an external storage component 1310 and a bar code component 1320.

The external storage component 1310 is a component for acquiring or downloading a file list stored in the external storage system 40, which is set in advance, and uploading a file to the external storage system 40, for example.

The bar code component 1320 is a component for assigning a bar code to an electronic file.

As described above, each component executes corresponding processing to implement a predetermined function. The component group 303 further includes other various components such as an encryption/decryption component for encrypting and decrypting an electronic file and a compression component for compressing an electronic file.

Additionally, each component of the component group 303 includes a component common I/F 1300. The component common I/F 1300 is an application program interface (API) defined for each component in common, and includes an API for generating a component and an API for executing processing of a component.

With the above-described configuration, in which the component common I/F 1300 is included in each component, effect of addition of a component is localized, for example. That is, the component is added without giving any effect on the flow execution unit 301 and/or the component management unit 302, for example. Therefore, in the service provision system 10 according to the present embodiment, it is possible to reduce time, or steps, for developing related to adding of a function (i.e., adding of a component that performs processing for implementing a function), etc.

The type conversion management unit 304 manages a type conversion of a data type. The data type compatible with each component is determined in advance. The type conversion management unit 304, accordingly, refers to a type-conversion information table 4000 as illustrated in FIG. 7 to generate a type conversion included in the type conversion group 305 in response to a request from the component.

Subsequently, the type conversion management unit 304 requests the generated type conversion to perform the type conversion. The type conversion is implemented by a program or a module for executing processing for the type conversion of the data type, and is defined as, for example, a class or a function. In addition, generating the type conversion means expanding the type conversion, which is defined as, for example, a class or a function, to a memory such as the RAM 14.

Examples of the data type include a data type "InputStream" indicating stream data, "LocalFilePath" indicating a path (address) of an electronic file stored in the storage device, etc., and "File" indicating an entity of an electronic file.

A description is given below of the type conversion information table 4000 with reference to FIG. 7. FIG. 7 is an example of the type conversion information table 4000.

As illustrated in FIG. 7, the type conversion information table 4000 includes, as data items, a data type before conversion, a data type after conversion, and a type conversion to be generated. That is, type conversion information stored in the type conversion information table 4000 associates each set of the data type before conversion and the data type after conversion with a type conversion for converting the data type before conversion to the data type after conversion.

The type conversion group 305 is a set of type conversions. The type conversion group 305 includes first type conversion 1410 for converting the data type "InputStream" to "LocalFilePath". The type conversion group 305 includes other type-conversion such as second type conversion for converting the data type "LocalFilePath" to "FILE".

Additionally, each of the type conversions included in the type conversion group 305 includes a type conversion common I/F 1400. The type conversion common I/F 1400 is an API defined for each type conversion in common, including an API for generating a type conversion and an API for performing type conversion processing of the type conversion.

With the above-described configuration, in which the component common I/F 1400 is included in each component, effect of addition of a component is localized, for example. In other words, any type conversion is added without giving any effect on the type conversion management unit 304, etc. Thus, in the service provision system 10 according to the present embodiment, it is possible to reduce time, or steps, for development related to adding of the type conversion.

A description is given of the processing flow information 1100 included in the application information 1000 that provides the external file printing service, with reference to FIGS. 8A and 8B. FIGS. 8A and 8B are illustrations of examples of the processing flow information 1100.

The processing flow information 1100 illustrated in FIG. 8A is information with which a file list acquisition flow is defined. The processing flow information 1100 illustrated in FIG. 8B is information with which a file download flow is defined.

The processing flow information 1100 illustrated in each of FIGS. 8A and 8B includes a flow name 1101 and flow details 1102. The flow name 1101 identifies the processing flow information 1100. The flow details 1102 define a content of the process included in the processing flow.

Additionally, the flow details 1102 includes a detailed process definition 1110. The detailed process definition 1110 includes "detailName" indicating a detailed process name identifying the detailed process definition and "component" indicating a component name of a component for executing the process. The detailed process definition 1110 further includes "operationName" indicating an operation to be executed by the component and "parameters" defining the parameter information.

The operation is a process performed by the component, and each component is able to perform one or more operations.

More specifically, referring to FIG. 8A, the detailed process definition 1110, which is included in the flow details 1102 of the processing flow information 1100, defines "detail 0" in "detailName". Additionally, the component name, "storage", which is a component name of the external storage component 1310, is defined in "component". The operation name of "getFilelist" that indicates that the external storage component 1310 executes the file list acquisition processing is defined in "OperationName". The parameter information used for the file list acquisition processing is defined in "parameters".

Referring now to FIG. 8B, the detailed process definition 1110 included in the flow details 1102 of the processing flow information 1100 defines "detail 0" in "detailName". Additionally, the component name, "storage", which is a component name of the external storage component 1310, is defined in "component". The operation name of "downloadFile" that indicates that the external storage component 1310 executes the file download processing is defined in "OperationName". The parameter information used for the file download processing is defined in "parameters".

Additionally, in the processing flow information 1100 illustrated in FIGS. 8A and 8B, a case where a single detailed process definition 1110 is included in the flow details 1102 is illustrated, however, when the processing flow includes two or more processes, the flow details 1102 includes two or more detailed processing definitions.

When two or more detailed processing definitions are included in the flow details 1102, an execution order of the processing defined individually in the two or more detailed processing definitions is an order from the top to down in the flow details 1102. However, the execution order in the present disclosure is not limited to the above order. For example, the processing flow information 1100 may defines, for example, the execution order of the processing defined in each of the detailed processing definitions.

A description is given below of layout information stored in the layout information storage unit 180 with reference to FIG. 9. FIG. 9 is a diagram illustrating an example of the layout information.

As illustrated in FIG. 9, one or more pieces of the layout information are stored in the layout information storage unit 180. In each layout information, a layout name and an input format are associated with each other.

The layout name is information for identifying a layout of the application screen. The input format is a data format that is displayable in a layout indicated with a layout name.

For example, the input form "list" is associated with the layout name of "one-column-list". This indicates that a data format of "list" is displayable on an application screen of the layout indicated by the layout name of "one-column-list". That is, a result of the processing flow of which the output format is "list" is displayable on the application screen of the layout indicated with the layout name of "one-column-list".

For example, the layout name of "preview" is associated with the input form of "list". This indicates that a data format of "list" is displayable on an application screen of the layout indicated by the layout name of "one-column-list". That is, a result of the processing flow of which the output format is "file" is displayable on the application screen of the layout indicated by the layout name of "preview".

As described above, the layout information associates the layout name indicating a layout with the input format indicating a data format displayable with the layout.

A description is given below of the component detail information 5000 stored in the component detail information storage unit 190, in particular the component detail information 5000 of the external storage component 1310 as an example, with reference to FIG. 10. FIG. 10 is an illustration of an example of the component detail information 5000.

The component detail information 5000 illustrated in FIG. 10 includes a component name 5001 with which the component name of "storage" identifying the external storage component 1310 is defined. In addition, the component detail information 5000 illustrated in FIG. 10 includes an operation definition 5002 with which a content of operations executable by the external storage component 1310 is defined.

The operation definition 5002 includes an operation content 5010 with which the file list acquisition processing is defined and an operation content 5020 with which the file download processing is defined. In each of operation content 5010 and 5020, "operationName" indicating the operation name, "list" indicating the data format of the processing result to be output, and the parameter information used for the operation are defined.

More specifically, as "operationName" of the operation content 5010, "getFileList" indicating an operation for executing a file list acquisition process is defined. In "outputFormat" of the operation content 5010, the data format of "list" that is the processing result of the file list acquisition processing is defined. Furthermore, in "parameters" of the operation content 5010, the parameter information used for the file list acquisition processing is defined.

Similarly, in "operationName" of the operation content 5020, EdownloadFile" indicating an operation for executing the file download processing is defined. In "outputFormat" of the operation content 5020, the data format of "file" that is the processing result of the file download processing is defined. Furthermore, in "parameters" of the operation content 5020, the parameter information used for the file download processing is defined.

As described above, in the component detail information 5000, the component name is associated with the content of one or more operations executable by a component corresponding to the component name. Additionally, in the content of the operation, the operation name, the data format of the processing result of the operation, and parameter information used for executing the operation are defined.

<Process>

Figure 11:
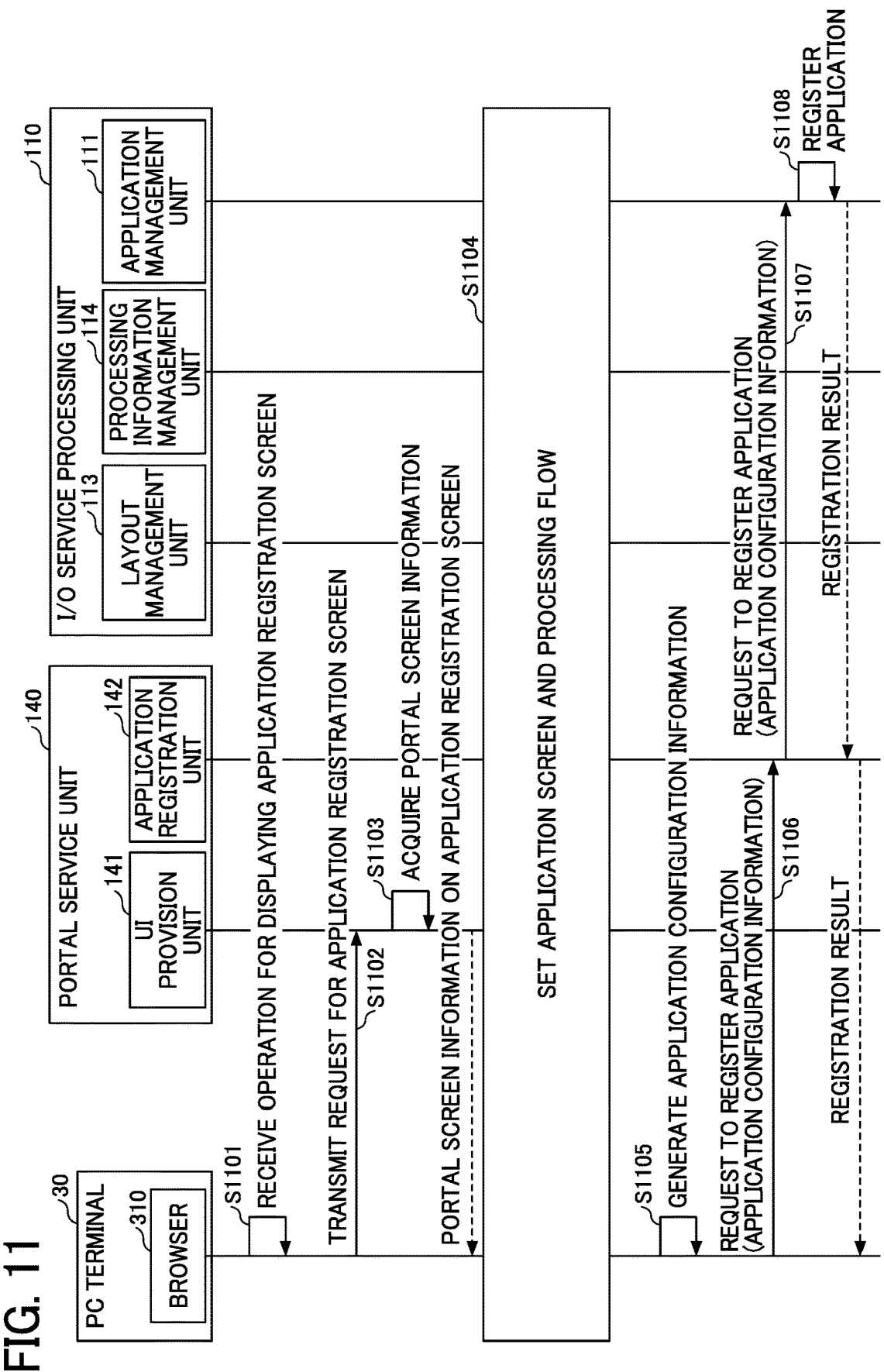
FIG. 11 is a sequence diagram illustrating an example of the entire operation of application registration according to the exemplary embodiment.

A detailed description is given below of processes of the information processing system 1 according to the present embodiment. A description is given of a process of registering, by the user of the PC terminal 30, an application to the service provision system 10 with reference to FIG. 11. FIG. 11 is a sequence diagram illustrating an example of the process of registering the application.

The browser 310 of the PC terminal 30 receives operation for displaying the application registration screen (S1101). The user of the PC terminal 30 presses a link to the application registration screen on the portal top screen and performs the operation for the application registration screen, for example.

Upon receiving the operation for displaying the application registration screen, the browser 310 of the PC terminal 30 transmits a request to display the application registration screen, namely the browser 310 of the PC terminal 30 requests the UI provision unit 141 of the portal service unit 140 to display the application registration screen (S1102).

Upon receiving the request to display the application registration screen, the UI provision unit 141 of the portal service unit 140 acquires the portal screen information 3000 on the application registration screen from the portal screen information storage unit 170 (S1103). Subsequently, the UI provision unit 141 transmits the portal screen information 3000 acquired from the portal screen information storage unit 170 to the browser 310.

Upon receiving the portal screen information 3000 on the application registration screen, the browser 310 of the PC terminal 30 sets one or more application screens and one or more processing flows of the application (S1104).

A description is given below of a process of setting one or more application screens and one or more processing flows of the external file printing application (here, three application screens and two processing flows) in S1104 described below with reference to FIG. 12. FIG. 12 is a sequence diagram illustrating an example of the process of setting the application screens and the processing flows of the external file printing application.

Upon receiving the portal screen information 3000 on the application registration screen, the browser 310 of the PC terminal 30 transmits a request (acquisition request) for a list of selectable layouts (selectable layout list) to the layout management unit 113 of the I/O service processing unit 110 (S1201).

Upon receiving the request for the selectable layout list, the layout management unit 113 of the I/O service processing unit 110 acquires the layout information from the layout information storage unit 180 (S1202). At this time, the layout management unit 113 may acquire all of the layout information stored in the layout information storage unit 180.

Subsequently, the layout management unit 113 transmits the layout information acquired from the layout information storage unit 180 to the browser 310.

Figure 13B:
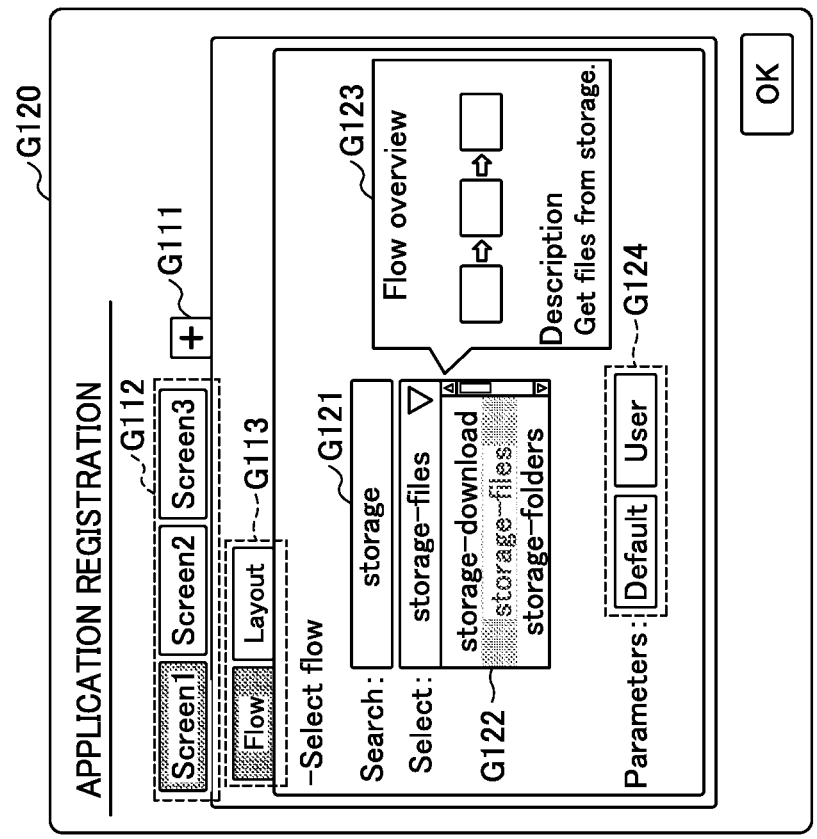
FIGS. 13A and 13B are illustrations of examples of an application registration screen (1/3) according to the exemplary embodiment.
Figure 13A:
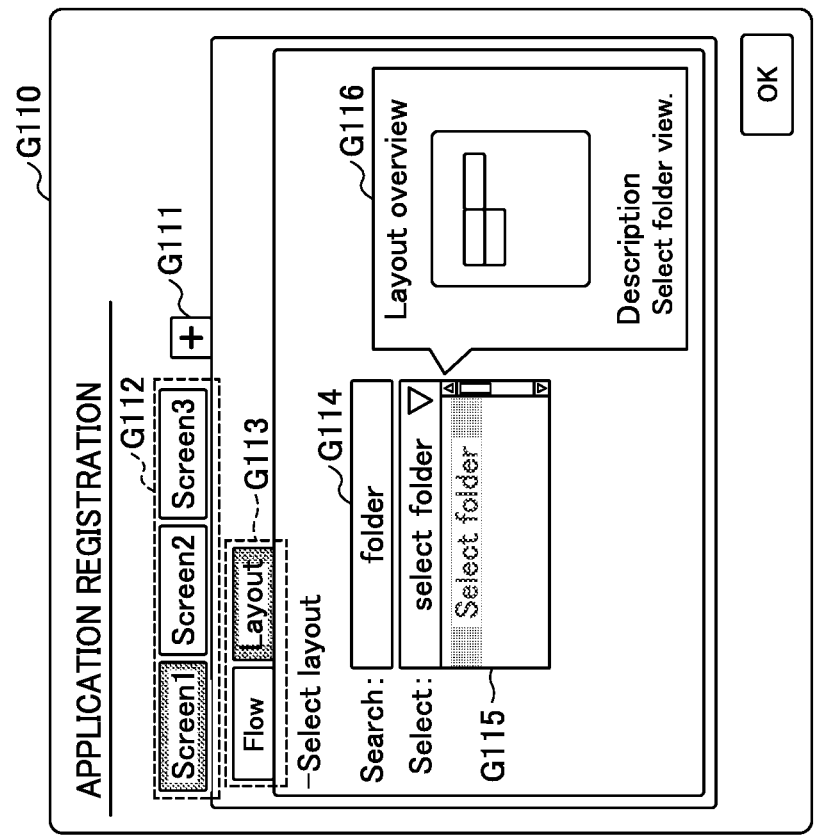

The browser 310 of the PC terminal 30 displays the application registration screen, for example an application registration screen G110 illustrated in FIG. 13A, based on the portal screen information 3000 on the application registration screen (S1203).

The application registration screen G110 illustrated in FIG. 13A includes a screen addition button G111. On a single screen, a single application screen or a single processing flow is registered. By pressing the screen addition button G111 (performing operation of adding a screen), the user adds a screen to a screen list G112.

The external file printing application includes the three application screens and the two processing flows. Accordingly, the user adds the three screens, "Screen 1", "Screen 2", and "Screen 3" to the screen list G112 by pressing the screen addition button G111 three times, for example. When the application registration screen G110 has "Screen 1" as a default screen, the user presses the screen addition button G111 twice.

When the user performs the operation of adding the screen, the browser 310 of the PC terminal 30 receives the operation of adding the screen (S1204). The three screens of "Screen 1", "Screen 2", and "Screen 3", accordingly, are added to the screen list G112.

The application registration screen G110 illustrated in FIG. 13A includes a display switching field G113. When the user presses a "Layout" button included in the display switching field G113, a screen for selecting a layout of the application is displayed. On the other hand, when the user presses a "Flow" button included in the display switching field G113, a screen for selecting a processing flow to be executed on the application screen is displayed.

The user inputs a desired character string to a layout search field G114 to narrow down layouts to be displayed in a layout candidate field G115 from all of the layouts indicated based on the layout information transmitted from the layout management unit 113. Subsequently, the user selects a desired layout from the layout candidate field G115.

As described above, the user selects the desired layout to be used for the application screen from the layouts, namely, the selectable layouts, indicated based on the layout information transmitted from the layout management unit 113.

Additionally, when the user selects one of the layouts displayed in the layout candidate field G115, an overview of the selected layout is displayed in a layout overview field G116.

Here, in the following description, the user performs an operation of selecting the layout of "select-folders", namely the user selects the layout of "select-folders", for example. The browser 310 of the PC terminal 30 receives the operation of selecting the layout (S1205). Accordingly, the layout information on the folder select screen is set for the external file printing application.

When the user presses the "Flow" button included in the display switching field G113, the application registration screen G120 illustrated in FIG. 13B is displayed by the browser 310. On the application registration screen G120 illustrated in FIG. 13B, the user inputs a desired character string in the processing flow search field G121 to narrow down processing flows to be displayed in a processing flow candidate field G122. The user, accordingly, selects a desired processing flow from the processing flow candidate field G122.

As described above, the user selects a processing flow being executable on the application screen with the layout selected in S1205 described above, by selecting the desired processing flow from the processing flow candidate field G122.

When the user selects one of the processing flows displayed in the processing flow candidate field G122, an overview of the selected processing flow is displayed in the processing flow overview filed G123.

Here, in the following description, the user performs an operation (processing flow select operation) of selecting the processing flow of "storage-files", namely the user selects the processing flow of "storage-files", for example. The browser 310 of the PC terminal 30 receives the processing flow select operation (S1206). Accordingly, the processing flow information 1100 on the processing flow (the processing flow having the flow name of "storage-files"), which is executable on the folder select screen is set for the external file printing application.

Upon receiving the processing flow select operation, the browser 310 of the PC terminal 30 transmits a request to specify an output format of the processing flow to the processing information management unit 114 of the I/O service processing unit 110 (S1207). The request to specify the output format of the processing flow includes a flow name of the processing flow selected by the user, namely, "storage-files" in the case described herein.

Upon receiving the request to specify the output format of the processing flow, the processing information management unit 114 of the I/O service processing unit 110 transmits, to the application management unit 111, a request (acquisition request) for processing flow information (S1208). Additionally, the request for the processing flow information includes the flow name of "storage-files" of the processing flow, which is selected by the user.

Upon receiving the request for the processing flow information, the application management unit 111 of the I/O service processing unit 110 acquires the processing flow information 1100 of the flow name of "storage-files" included in the request for the processing flow information, from the application information storage unit 150 (S1209). Then, the application management unit 111 transmits the processing flow information 1100 acquired from the application information storage unit 150 to the processing information management unit 114.

The processing information management unit 114 of the I/O service processing unit 110 refers to the component detail information 5000 stored in the component detail information storage unit 190, and specifies the output format of the series of processes based on the processing flow information 1100 transmitted from the application management unit 111 (S1210).

That is, the processing information managing unit 114 refers to the component detail information 5000 stored in the component detail information storage unit 190 and specifies an output format of operation corresponding to a component that is the last to be executed, out of the components defined in the processing flow information 1100 transmitted from the application management unit 111.

For example, in the processing flow information 1100 (processing flow information 1100 of the flow name of "storage-files") illustrated in FIG. 8A, the operation corresponding to the component, which is the last to be executed last, has the operation name of "getFilelist" of the component name of "storage". Accordingly, the processing information management unit 114 refers to the component detail information 5000 illustrated in FIG. 10 and specifies the output format of "list" corresponding to the operation name of "getFilelist" of the component name of "storage".

Subsequently, the processing information management unit 114 transmits the specified output format to the browser 310.

Here, in the following description, an operation of selecting "Screen 2" (switching to Screen 2) out of the screen list G112 is performed by the user with the screen list G112, for example. The browser 310 receives the operation of switching to "Screen 2" (S1211).

Upon receiving the operation of switching to Screen 2, the browser 310 of the PC terminal 30 transmits a request (acquisition request) for a selectable layout list to the layout management unit 113 of the I/O service processing unit 110 (S1212). Additionally, the request for the selectable layout list includes the output format (namely, "list" in the case described herein) transmitted from the processing information management unit 114 in S1210 as described above.

As described above, the request for the selectable layout list includes the output format of the processing flow that is set on the screen that is displayed one before the current screen. That is, when the current screen is "Screen N", the request for the selectable layout list includes the output format of the processing flow set on "Screen (N−1)". N is an integer equal to or larger than 2.

Upon receiving the request for the selectable layout list, the layout management unit 113 of the I/O service processing unit 110 acquires the layout information from the layout information storage unit 180 (S1213). At this time, the layout management unit 113 acquires the layout information in which the output format included in the request for the selectable layout list is set as an input format, from the layout information storage unit 180.

That is, the layout management unit 113 acquires the layout information in which "list" is set as an input format from the layout information storage unit 180.

Subsequently, the layout management unit 113 transmits the layout information acquired from the layout information storage unit 180 to the browser 310.

Figure 14B:
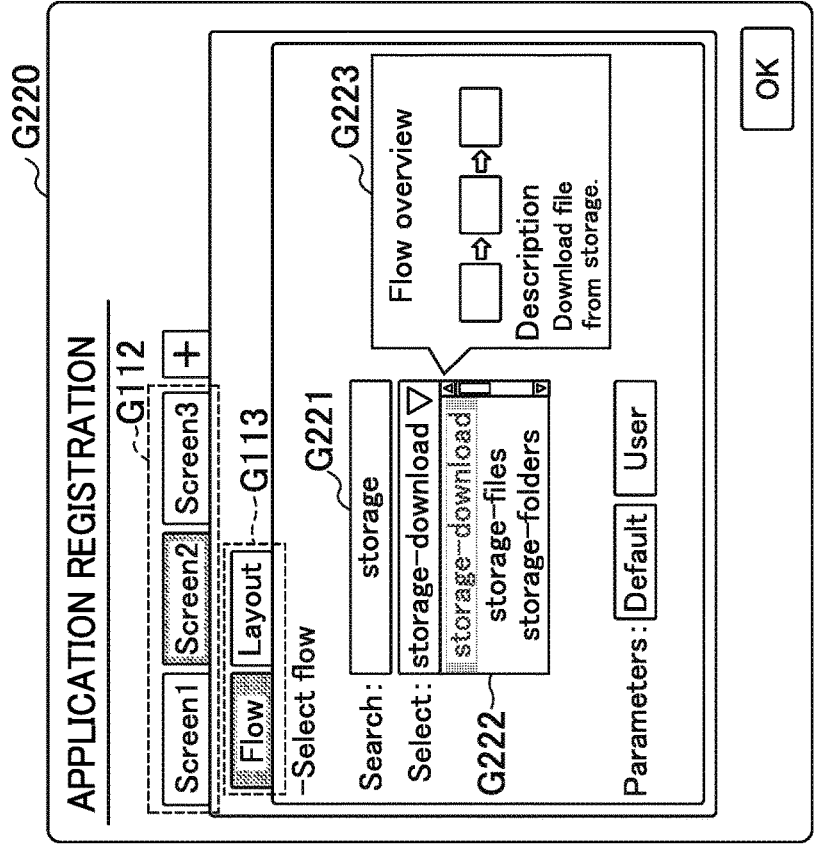
FIGS. 14A and 14B are illustrations of examples of the application registration screen (2/3)
Figure 14A:
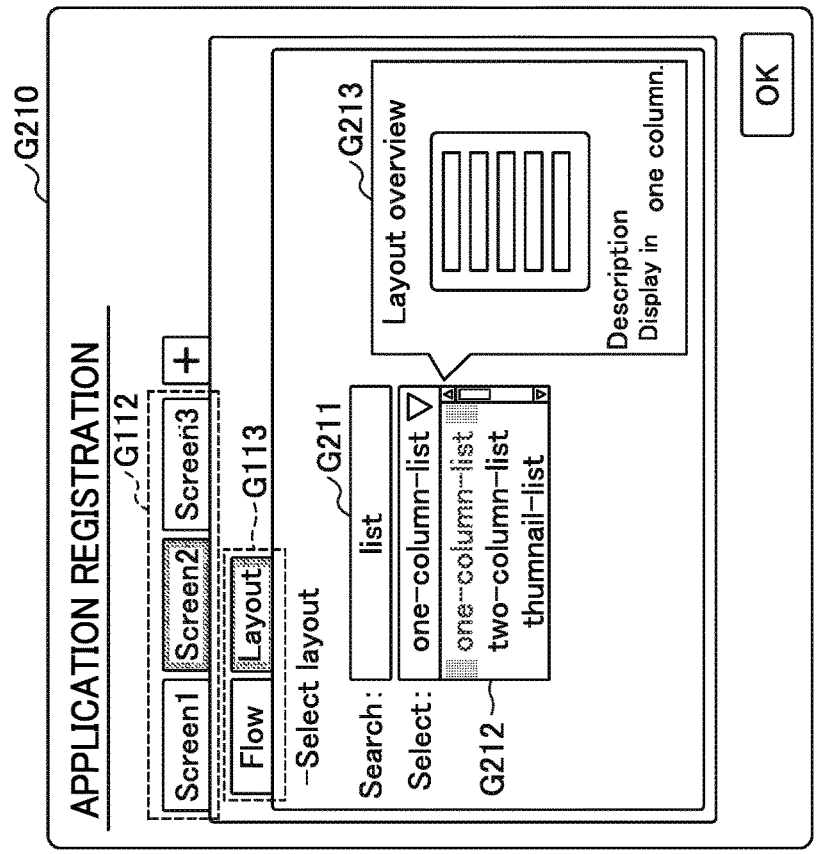

When receiving the layout information, the browser 310 displays an application registration screen G210 illustrated in FIG. 14A. On the application registration screen G210 illustrated in FIG. 14A, the user inputs a desired character string in the layout search field G211 to narrow down layouts to be displayed in the layout candidate field G212, from the layouts indicated by the layout information transmitted from the layout management unit 113. The user, accordingly, selects a desired processing flow from the processing flow candidate field G212.

As described above, the user selects a desired layout to be used for the application screen from the layouts, namely the selectable layouts, indicated by the layout information transmitted from the layout management unit 113. The selectable layout is a layout having an input format of the processing flow that matches the output format of the processing flow set on the screen that is displayed one before the current screen.

When the user selects one of the layouts displayed in the layout candidate field G212, an overview of the selected layout is displayed in the layout overview field G213.

Here, in the following description, the user performs an operation of selecting the layout of "one-column-list", namely the user selects the layout of "one-column-list", for example. The browser 310 of the PC terminal 30 receives the operation of selecting the layout (S1214). Accordingly, the layout information on the file list screen is set for the external file printing application.

When the user presses the "Flow" button included in the display switching field G113, an application registration screen G220 illustrated in FIG. 14B is displayed by the browser 310. On the application registration screen G220 illustrated in FIG. 14B, the user inputs a desired character string in the processing flow search field G221 to narrow down processing flows to be displayed in the processing flow candidate field G222. The user, accordingly, selects a desired processing flow from the processing flow candidate field G222.

As described above, the user selects a desired processing flow executable on the application screen having the layout selected in S1214, which is described above, by selecting the desired processing flow from the processing flow candidate field G222.

When the user selects one of the processing flows displayed in the processing flow candidate field G222, an overview of the selected processing flow is displayed in the processing flow overview filed G223.

Here, in the following description, the user performs an operation of selecting the processing flow of "storage-download", namely the user selects the processing flow of "storage-download", for example. The browser 310 of the PC terminal 30 receives the operation of selecting the processing flow (S1215). Accordingly, the processing flow information 1100 on the processing flow (the processing flow of the flow name of "storage-download"), which is executable with the folder selection screen is set for the external file printing application.

Upon receiving the operation of selecting the processing flow, the browser 310 of the PC terminal 30 transmits a request to specify an output format of the processing flow to the processing information management unit 114 of the I/O service processing unit 110 (S1216). The request to specify the output format of the processing flow includes the flow name of the processing flow selected by the user, namely, "storage-download" in the case described herein.

Upon receiving the request to specify the output format of the processing flow, the processing information management unit 114 of the I/O service processing unit 110 transmits a request (acquisition request) for processing flow information to the application management unit 111 (S1217). Additionally, the request for the processing flow information includes the flow name of "storage-download" of the processing flow, which is selected by the user.

Upon receiving the request for the processing flow information, the application management unit 111 of the I/O service processing unit 110 acquires the processing flow information 1100 of the flow name of "storage-download" included in the request for the processing flow information, from the application information storage unit 150 (S1218). Then, the application management unit 111 transmits the processing flow information 1100 acquired from the application information storage unit 150 to the processing information management unit 114.

The processing information management unit 114 of the I/O service processing unit 110 refers to the component detail information 5000 stored in the component detail information storage unit 190 and specifies the output format of the series of processes based on the processing flow information 1100 transmitted from the application management unit 111 (S1219).

That is, the processing information managing unit 114 refers to the component detail information 5000 stored in the component detail information storage unit 190 and specifies the output format of the operation of a component that is the last to be executed, out of the components defined in the processing flow information 1100 transmitted from the application management unit 111.

For example, in the processing flow information 1100 (processing flow information 1100 of the flow name of "storage-download") illustrated in FIG. 8B, the operation of the component that is the last to be executed has the operation name of "downloadFile" of the component name of "storage". Accordingly, the processing information management unit 114 refers to the component detail information 5000 illustrated in FIG. 10 and specifies the output format of "file" corresponding to the operation name of "downloadFile" of the component name of "storage".

Subsequently, the processing information management unit 114 transmits the specified output format to the browser 310.

Here, in the following description, an operation of selecting "Screen 3" (switching to "Screen 3") is performed by the user from the screen list G112, for example. The browser 310 receives the operation of switching to "Screen 3" (S1220).

Upon receiving the operation of switching to Screen 3, the browser 310 of the PC terminal 30 transmits a request (acquisition request) for a selectable layout list to the layout management unit 113 of the I/O service processing unit 110 (S1221). Additionally, the request for the selectable layout list includes the output format (namely, "file" in the case described herein) transmitted from the processing information management unit 114 in S1220 as described above.

Upon receiving the request for the selectable layout list, the layout management unit 113 of the I/O service processing unit 110 acquires the layout information from the layout information storage unit 180 (S1222). At this time, the layout management unit 113 acquires the layout information in which the output format included in the request for the selectable layout list is set as an input format, from the layout information storage unit 180.

Subsequently, the layout management unit 113 transmits the layout information acquired from the layout information storage unit 180 to the browser 310.

Figure 15:
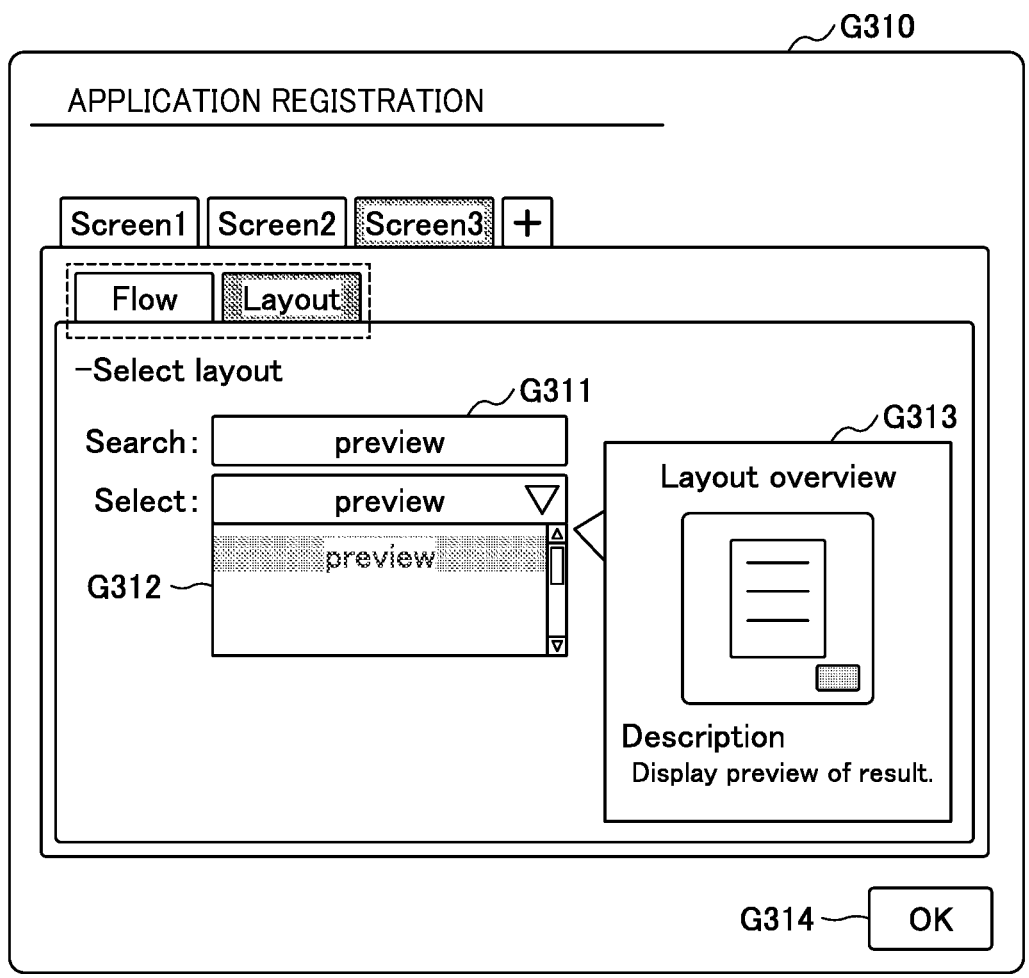
FIG. 15 is an illustration of an example of the application registration screen (3/3)

When receiving the layout information is received, the browser 310 displays an application registration screen G310 illustrated in FIG. 15. On the application registration screen G310 illustrated in FIG. 15, the user inputs a desired character string in the layout search field G311 to narrow down layouts to be displayed in the layout candidate field G312, from the layouts indicated by the layout information transmitted from the layout management unit 113. The user, accordingly, selects a desired layout from the layout candidate field G312.

As described above, the user selects a desired layout to be used for the application screen from the layouts, namely, the selectable layouts, indicated by the layout information transmitted from the layout management unit 113. The selectable layout is a layout having an input format of the processing flow that matches the output format of the processing flow set on the screen that is displayed one before the current screen.

When the user selects a layout displayed in the layout candidate field G312, an overview of the selected layout is displayed in the layout overview field G313.

Here, in the following description, the user performs an operation of selecting the layout of "preview", namely the user selects the layout of "preview", for example. The browser 310 of the PC terminal 30 receives the operation of selecting the layout (S1223). Accordingly, the layout information on the preview screen is set for the external file printing application.

Subsequently, the user presses an OK button G314 to perform an operation of registering the application, namely the user registers the application, here. The browser 310 receives the operation of registering the application (S1224). As described above, the process of setting the application screens and the processing flows of the external file printing application is completed. Because no processing flow is executed on the preview screen in the external file printing application, selecting of one of the processing flows is not performed.

Referring again to FIG. 11, subsequent to S1104, the browser 310 generates the application configuration information 1200 as illustrated in FIG. 16 when receiving the operation of registering the application in S1224, which is described above (S1105).

A description is given below of the application configuration information 1200, with reference to FIG. 16. FIG. 16 is an illustration of an example of the application configuration information 1200.

The application configuration information 1200 as illustrated in FIG. 16 includes an application type 1201, an application name 1202, and a view definition 1203.

The application type 1201 defines a type of the application. Examples of the type of the application include a print type, a scan type, a fax type, and a mail transmission type. In the example illustrated in FIG. 16, "app_type":"print" indicating that the type of the application is a print type is defined.

The application name 1202 defines a name of the application. In the example illustrated in FIG. 16, "appName": "exernal file print application" indicating that the name of the application is "external file printing application" is defined.

The view definition 1203 defines view content that includes one or more application screens, one or more processing flows each of which is executable on the application screen, and parameter information used for executing the processing flow.

In the view definition 1203 of the application configuration information 1200 illustrated in FIG. 16, pieces of view information 1210 to 1230 are defined. Each of the pieces of view information 1210 to 1230 includes "name" indicating a view name identifying corresponding view information, "layoutName" indicating a layout name of corresponding one of the application screens, and "flowName" indicating a flow name of corresponding one of the processing flows, which is executable on the application screen.

Additionally, each of the pieces of the view information 1210 and 1220 includes "defaultParameters" indicating parameter information having a default parameter value, which is used for executing the corresponding processing flow with the other parameter information. Similarly, each of the pieces of the view information 1210 and 1220 includes "userInputParameter" indicating parameter information having a parameter value input by the user, which is used for executing the corresponding processing flow with the other parameter information.

More specifically, "view 1" is defined in "name" of the view information 1210 of the view definition 1203 of the application configuration information 1200 illustrated in FIG. 16. Additionally, in "layoutName", the layout name of "select-folder", which is selected on the application registration screen G110 illustrated in FIG. 13A, is defined. Additionally, in "flowName", the flow name of "storage-files", which is selected on the application registration screen G120 illustrated in FIG. 13B, is defined. "defaultParameters" and "userInputParameters" define the parameter information used for the series of processes based on the processing flow information 1100 of the flow name of "storage-files".

Similarly, "view 2" is defined in "name" of the view information 1220 of the view definition 1203 of the application configuration information 1200 illustrated in FIG. 16. Additionally, in "layoutName", the layout name of "one-column-list", which is selected on the application registration screen G210 illustrated in FIG. 14A, is defined. Additionally, in "flowName", the flow name of "storage-download", which is selected on the application registration screen G220 illustrated in FIG. 14B, is defined. "defaultParameters" and "userInputParameters" define the parameter information used for the series of processes based on the processing flow information 1100 of the flow name of "storage-download".

Similarly, "view 3" is defined in "name" of the view information 1230 of the view definition 1203 of the application configuration information 1200 illustrated in FIG. 16. Additionally, in "layoutName", the layout name of "preview", which is selected on the application registration screen G310 illustrated in FIG. 15, is defined. Additionally, in "flowName", "null" indicating that no processing flow is set is defined.

As described above, in the application configuration information 1200, one or more application screens for using the application, the processing flows each of which is executable on one of the one or more application screens, and the parameter information used for executing each processing flow are defined.

When generating the application configuration information 1200, the browser 310 transmits a request to register the application to the application registration unit 142 of the portal service unit 140 (S1106). Additionally, the request to register the application includes the application configuration information 1200 generated in S1105.

Upon receiving the request to register the application, the application registration unit 142 of the portal service unit 140 transmits the request to register the application to the application management unit 111 of the I/O service processing unit 110 (S1107).

Upon receiving the request to register the application, the application management unit 111 of the I/O service processing unit 110 registers the application (S1108). Then, the application management unit 111 transmits a registration result to the browser 310.

That is, the application management unit 111 stores, in the application information storage unit 150, the application configuration information 1200, which is included in the request to register the application, in association with the application ID. Then, the application management unit 111 transmits to the browser 310 the registration result including the application ID via the application registration unit 142.

As described above, the information processing system 1 according to the present embodiment allows the user to register the applications in the service provision system 10 using the PC terminal 30. Moreover, the information processing system 1 according to the present embodiment allows the user to register the application (application information 1000) using the PC terminal 30 easily by setting, for example, layouts of the one or more application screens for using the application and the processing flows each of which is executed on one of the one or more application screens.

Furthermore, the information processing system 1 according to the present embodiment allows the user to register the applications (application information 1000) which provide the various types of services even when the user (such as, a person in charge of planning) does not have expert knowledge or experience related to programming language, etc.

Figure 17:
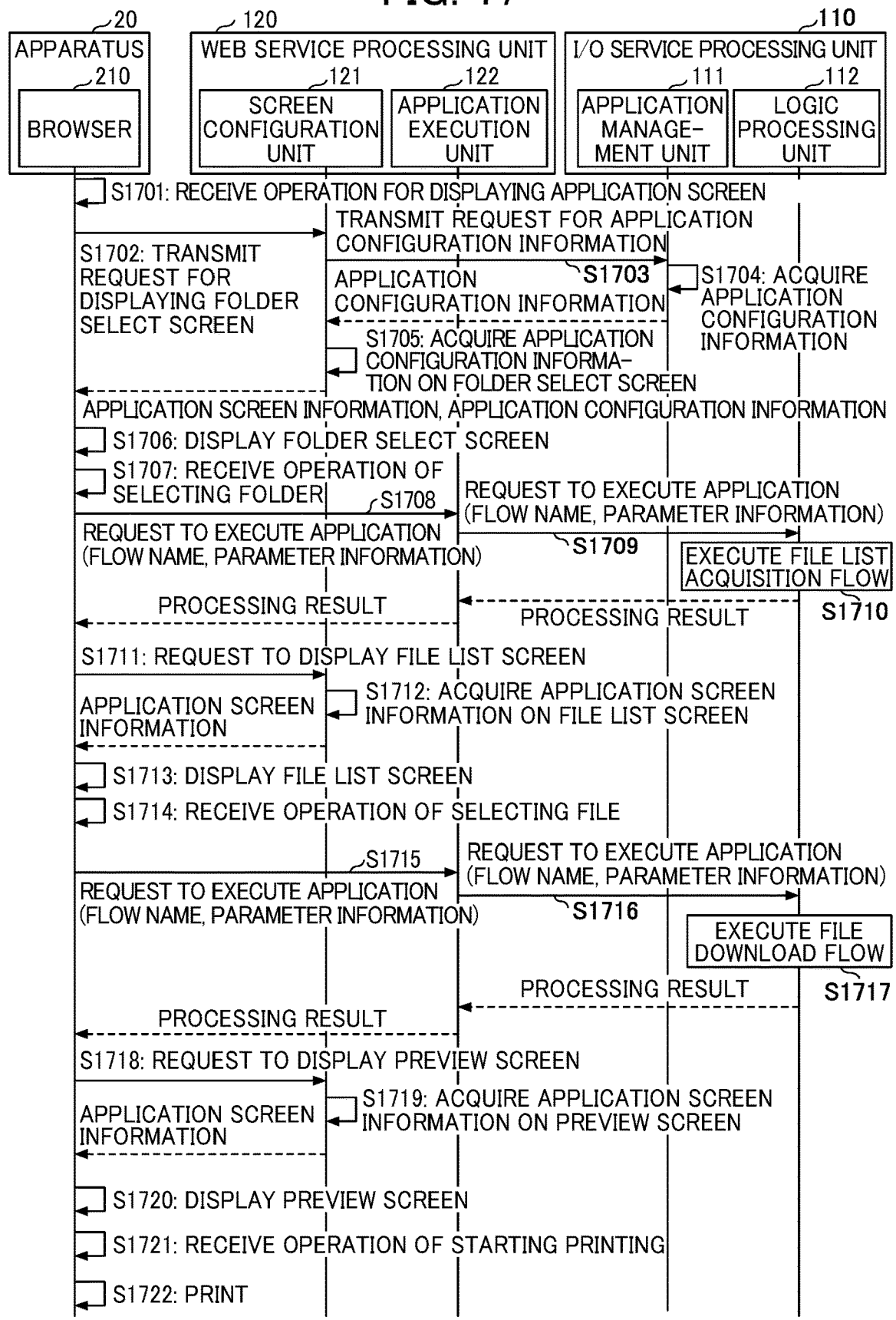
FIG. 17 is a sequence diagram illustrating an example of the entire process of using the external file printing service according to the exemplary embodiment.

A description is given below of a process in which the user of the apparatus 20 uses the external file printing service with reference to FIG. 17. FIG. 17 is a sequence diagram illustrating an example of the entire process of using the external file printing service.

The browser 210 of the apparatus 20 receives operation for displaying an application screen (S1701). The user of the apparatus 20 performs the operation for displaying the application screen by inputting a URL of the application screen of the external file printing service to an address bar of the browser 210, for example.

Upon receiving the operation for displaying the application screen of the external file printing service, the browser 210 of the apparatus 20 transmits a request for displaying a folder select screen to the screen configuration unit 121 of the web service processing unit 120 (S1702). The request for displaying the folder select screen includes the application ID of the application information 1000, which provides the external file printing service.

The screen configuration unit 121 of the web service processing unit 120 transmits a request for application configuration (acquisition request) to the application management unit 111 of the I/O service processing unit 110 in response to the request to display the folder select screen (S1703). The request for the application configuration includes the application ID of the application information 1000, which provides the external file printing service.

Upon receiving the request for the application configuration, the application management unit 111 of the I/O service processing unit 110 acquires the application configuration information 1200 stored in association with the application ID, which is included in the acquisition request, from the application information storage unit 150 (S1704). The application management unit 111, then, transmits the application configuration information 1200 acquired from the application information storage unit 150 to the screen configuration unit 121.

Subsequently, the screen configuration unit 121 of the web service processing unit 120 acquires the application screen information 2000 that is associated with the application ID and corresponding to the folder select screen from the application screen information storage unit 160 (S1705). The screen configuration unit 121 specifies the application screen information 2000 on the folder select screen based on "select-folder" defined in "layoutName" of the view information 1210 included in the application configuration information 1200 transmitted from the application management unit 111.

The screen configuration unit 121 transmits, to the browser 210, the application screen information 2000 acquired from the application screen information storage unit 160 and the application configuration information 1200 transmitted in S1704, which is described above.

Figure 18:
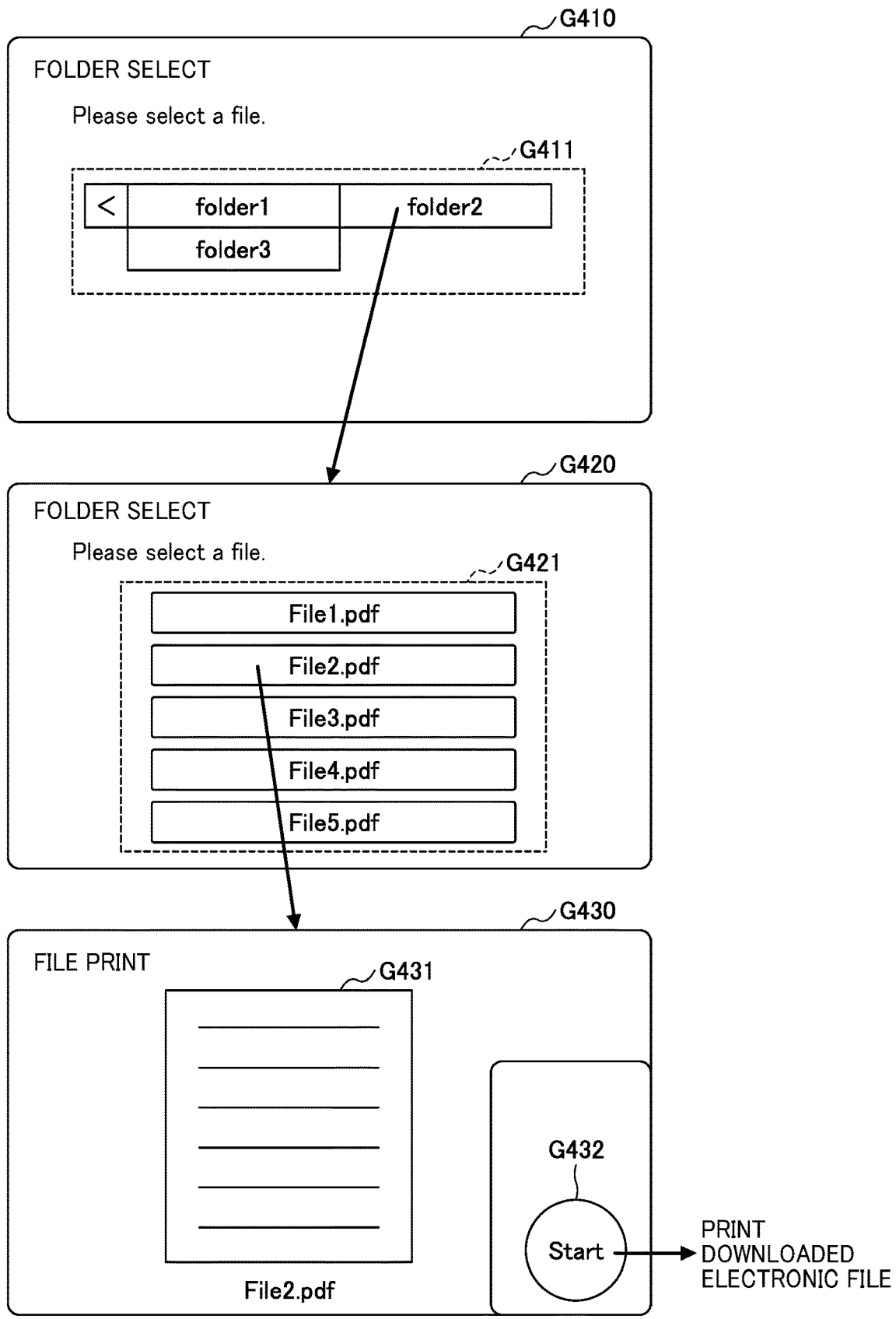
FIG. 18 is an illustration of an example of a screen transition of the application screen in the external file printing application.

The browser 210 of the apparatus 20 displays a folder select screen G410 illustrated in FIG. 18 based on the application screen information 2000 and the application configuration information 1200 received from the screen configuration unit 121 (S1706).

The folder select screen G410 illustrated in FIG. 18 is a screen that is used by the user of the apparatus 20 for selecting a folder of the external storage system 40.

The folder select screen G410 of FIG. 18 includes a folder list G411. The user selects a desired folder from the folder list G411. Here, in the following description, the user performs an operation of selecting "folder2" (folder select operation), namely the user selects "folder2", for example. The browser 210 of the apparatus 20 receives the folder select operation (S1707).

Upon receiving the folder select operation, the browser 210 of the apparatus 20 transmits a request to execute the application to the application execution unit 122 of the web service processing unit 120 (S1708). The request to execute the application includes the flow name of "storage-files", which is defined in "flowName" in the view information 1210 of the application configuration information 1200 and the parameter information. The parameter information includes the folder ID of the folder of "folder2", which is selected by the user form the folder list G411 with the folder select screen G410 illustrated in FIG. 18.

Upon receiving the application execution request, the application execution unit 122 of the web service processing unit 120 transmits the request to execute the application to the logic processing unit 112 of the I/O service processing unit 110 (S1709).

Upon receiving the request to execute the application, the logic processing unit 112 of the I/O service processing unit 110 performs the process of executing the file list acquisition flow (S1710). That is, the logic processing unit 112 performs the series of processes based on the processing flow information 1100 of the flow name of "storage-files" using the parameter information included in the request to execute the application. A detailed description of the file list acquisition flow is deferred.

Subsequently, the logic processing unit 112 transmits a processing result obtained by processing the file list acquisition flow to the browser 210 via the web service processing unit 120. The processing result is a file list stored in the folder of "folder2" of the external storage system 40 and has a data format of "list".

Upon receiving the processing result of the file list acquisition flow, the browser 210 of the apparatus 20 transmits a request to display the file list screen to the screen configuration unit 121 of the web service processing unit 120 (S1711).

Upon receiving the request to display the file list screen, the web service processing unit 120 of the screen configuration unit 121 acquires the application screen information 2000 that is associated with the application ID of the external file printing application and corresponding to the file list screen from the application screen information storage unit 160 (S1712). The screen configuration unit 121 specifies the application screen information 2000 on the file list screen based on "one-column-list", which is defined in "layoutName" of the view information 1220 included in the application configuration information 1200 transmitted from the application management unit 111.

The screen configuration unit 121 transmits to the browser 210 the application screen information 2000 acquired from the application screen information storage unit 160.

The browser 210 of the apparatus 20 displays a folder select screen G420 as illustrated in FIG. 18 based on the application screen information 2000 and the application configuration information 1200 received from the screen configuration unit 121 (S1713).

The file list screen G420 illustrated in FIG. 18 is a screen that is used by the user for selecting a file stored in the folder selected on the folder select screen G410 of FIG. 18.

The file list screen G420 illustrated in FIG. 18 includes a file list G421. The file list G421 is displayed based on the processing result of the file list acquisition flow (namely, the file list stored in the folder of "folder2" of the external storage system 40). The user selects a desired file from the file list G421. Here, in the following description, the user performs operation (file select operation) of selecting "File2.pdf", namely the user selects "File2.pdf", for example. The browser 210 of the apparatus 20 receives the file select operation (S1714).

Upon receiving the file select operation, the browser 210 of the apparatus 20 transmits a request to execute the application to the application execution unit 122 of the web service processing unit 120 (S1715). The request to execute the application includes the flow name of "storage-files", which is defined in "flowName" of the view information 1220 included in the application configuration information 1200, and the parameter information. The parameter information includes the file ID of the file "File 2. pdf" selected by the user from the file list G421 on the file list screen G420 illustrated in FIG. 18.

Upon receiving the request to execute the application, the application execution unit 122 of the web service processing unit 120 transmits the request to execute the application to the logic processing unit 112 of the I/O service processing unit 110 (S1716).

Upon receiving the request to execute the application, the logic processing unit 112 of the I/O service processing unit 110 performs a process of executing the file download flow (S1717). That is, the logic processing unit 112 performs the series of processes based on the processing flow information 1100 of the flow name of "storage-download" using the parameter information included in the execution request. A detailed description of the file download flow is deferred.

Subsequently, the logic processing unit 112 transmits a processing result obtained by processing the file download flow to the browser 210 via the web service processing unit 120. The processing result is an electronic file of "folder2", which is a file selected by the user, and has a data format of "file".

Upon receiving the processing result of the file download flow, the browser 210 of the apparatus 20 transmits a request to display the preview screen to the screen configuration unit 121 of the web service processing unit 120 (S1718).

Upon receiving the request to display the preview screen, the web service processing unit 120 of the screen configuration unit 121 acquires the application screen information 2000 that is associated with the application ID and corresponding to the preview screen, from the application screen information storage unit 160 (S1719). The screen configuration unit 121 specifies the application screen information 2000 on the preview screen based on "preview", which is defined in "layoutName" of the view information 1230 included in the application configuration information 1200 transmitted from the application management unit 111.

The screen configuration unit 121 transmits to the browser 210 the application screen information 2000 acquired from the application screen information storage unit 160.

The browser 210 of the apparatus 20 displays a preview screen G430 as illustrated in FIG. 18 based on the application screen information 2000 and the application configuration information 1200 received from the screen configuration unit 121 (S1720).

The preview screen G430 illustrated in FIG. 18 is a screen that displays a preview of content corresponding to the file selected with the file list screen G420 illustrated in FIG. 18.

The preview screen G430 illustrated in FIG. 18 includes a preview field G431 in which the content of the file selected by the user is displayed. Further, the preview screen G430 illustrated in FIG. 18 includes a print button G432 for printing the file displayed in the preview field G431. The user prints out the file displayed on the preview field G431 by performing operation of starting printing (print start operation) by pressing the print button G432.

Here, in the following description, the user performs the print start operation, for example. The browser 210 of the apparatus 20 receives the print start operation (S1721).

Upon receiving the print start operation, the browser 210 of the apparatus 20 controls the printer 25 and prints out the file displayed in the preview field G431 (S1722).

Through this, the service provision system 10 according to the present embodiment provides the external file printing service.

In the present embodiment described above, the file list screen G420 illustrated in FIG. 18 is displayed as the file list screen of the external file printing application. Alternatively, a file list screen G500 illustrated in FIG. 19A may be displayed, for example. The file list screen G500 illustrated in FIG. 19A includes a file list G501 in which two columns of file names are displayed.

Figure 19B:
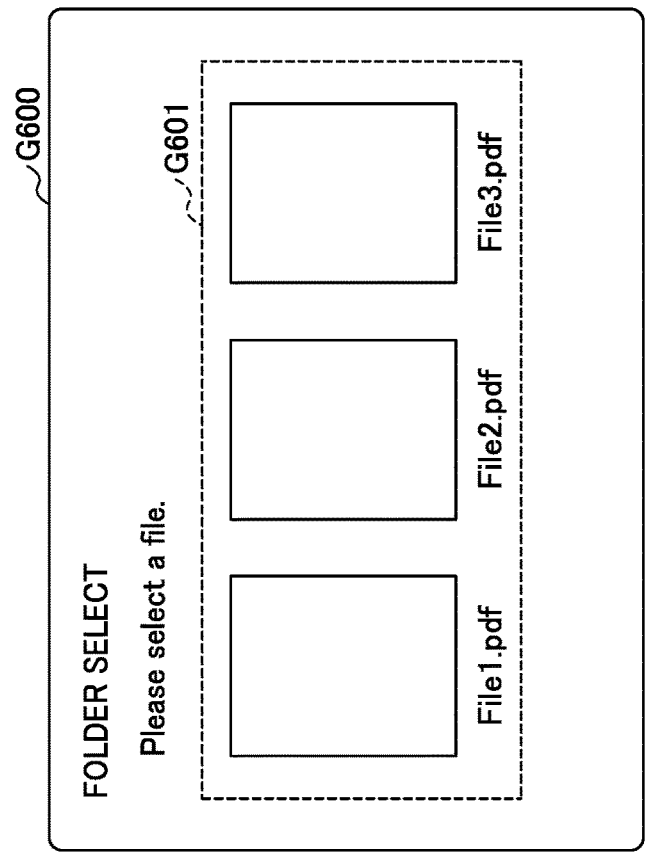
FIGS. 19A and 19B are illustrations of other examples of the application screen.
Figure 19A:
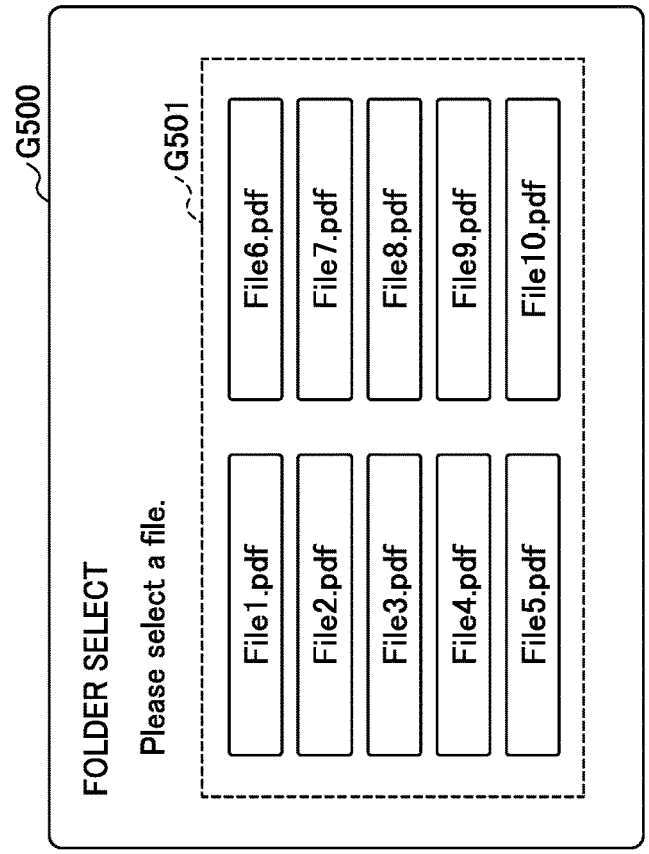

The file list screen G500 illustrated in FIG. 19A is displayed, when "two-column-list" is defined in "layoutName" of the view information 1220 included in the application configuration information 1200 of the external file printing application, for example.

Alternatively, a file list screen G600 illustrated in FIG. 19B may be displayed as a file list screen of the external file printing application, for example. The file list screen G600 illustrated in FIG. 19B includes a file list G601 in which icons indicating files, respectively, are displayed.

The file list screen G600 illustrated in FIG. 19B is displayed, when "icon-list" is defined in "layoutName" of the view information 1220 included in the application configuration information 1200 of the external file printing application, for example.

Figure 20:
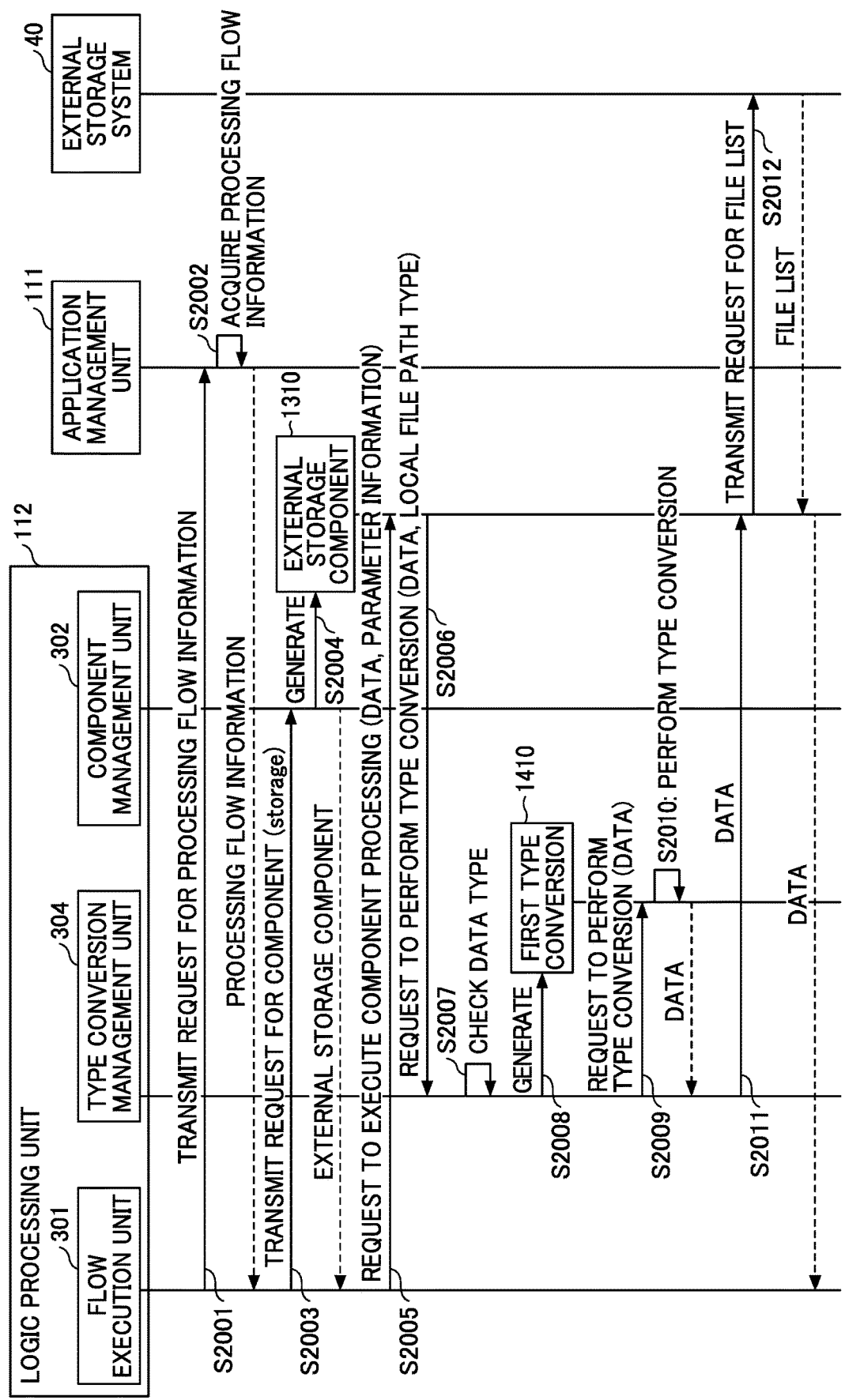
FIG. 20 is a sequence diagram illustrating an example of a process of executing a file list acquisition flow according to the exemplary embodiment.

A detailed description is given below of a process of S1710 (process of executing file list acquisition flow) with reference to FIG. 20. FIG. 20 is a sequence diagram illustrating an example of the process of executing the file list acquisition flow.

Upon receiving the application execution request from the application execution unit 122, the flow execution unit 301 transmits a request (acquisition request) for a processing flow to the application management unit 111 (S2001). The acquisition request includes the flow name of "storage-files".

Upon receiving the request for the processing flow, the application management unit 111 acquires the processing flow information 1100 of the flow name of "storage-files", which is included in the acquisition request, from the application information storage unit 150 (S2002). Then, the application management unit 111 transmits the processing flow information 1100 acquired from the application information storage unit 150 to the flow execution unit 301.

Here, in the following description, the application management unit 111 transmits the processing flow information 1100 illustrated in FIG. 8A to the flow execution unit 301, for example.

The flow execution unit 301, subsequently, transmits to the component management unit 302, a request for a component (component acquisition request) based on the process flow information 1100 (S2003).

That is, the flow execution unit 301 transmits, to the component management unit 302, the component acquisition request for the component of the component name of "storage", which is defined in "component" included in the detailed processing definition 1110 of the processing flow information 1100 illustrated in FIG. 8A.

Upon receiving the component acquisition request, the component management unit 302 generates a component having the component name of "storage" (namely, external storage component 1310) (S2004). The external storage component 1310 may be generated by using the API for generating a component that is defined in the component common I/F 1300.

The component management unit 302 transmits the generated external storage component 1310 to the flow execution unit 301. That is, the component management unit 302 transmits, to the flow execution unit 301, an address on a memory such as the RAM 14, to which the external storage component 1310 is expanded.

Subsequently, the flow execution unit 301 transmits, to the external storage component 1310, a request to execute the component processing (S2005). The request to execute the component processing includes data and parameter information. In the request to execute the component processing, the operation name of "getFilelist of operation" is designated, for example, and "getFilelist" requests the external storage component 1310 to operate.

The data is, for example, received from the browser 210 as a data type of "InputStream" and an electronic file to be processed by the component. That is, the flow execution unit 301 passes the electronic file to be processed by the component as a simple "data" (without specifying a data type), and requests to execute the processing. In the present embodiment, various kinds of information such as an electronic file of which a data type is not specified are simply referred to as "data".

However, in the file list acquisition flow, processing targets such as electronic files are not received from the browser 210 or the like. Accordingly, NULL is set to the data, for example.

The parameter information is the parameter information included in the request to execute the application.

In response to receiving the request to execute the component processing, the external storage component 1310 transmits a request to perform type conversion to the type conversion management unit 304 (S2006). The request to perform the type conversion includes data and a designation of "LocalFilePath" indicating a data type that the external storage component 1310 supports.

Upon receiving the request to perform the type conversion, the type conversion management unit 304 checks whether or not the data type of the data included in the request to perform the type conversion matches the data type designated (S2007).

In this example, the data type of the data included in the type conversion request is "InputStream", while the designated data type is "LocalFilePath". Accordingly, the type conversion management unit 304 determines that the data type of the data included in the request to perform the type conversion does not match the designated data type.

Then, the type conversion management unit 304 refers to the type conversion information table 4000 and specifies type conversion for converting the data type of "InputStream" into the data type of "LocalFilePath" (here, the first type conversion 1410 is specified). Subsequently, the type conversion management unit 304 generates the specified first type conversion 1410 (S2008). The first type conversion 1410 may be generated by using the type conversion common I/F 1400.

Subsequently, the type conversion management unit 304 transmits the request to perform the type conversion to the first type conversion 1410 (S2009). Additionally, the request to perform the type conversion includes data.

Upon receiving the request to perform the type conversion, the first type conversion 1410 performs the type conversion to convert the data type of the data, which is included in the request to perform the type conversion, from "InputStream" to "LocalFilePath" (S2010). Then, the first type conversion 1410 transmits the data of which the data type is converted to the type conversion management unit 304.

Upon receiving the data from the first type conversion 1410, the type conversion management unit 304 transmits the data to the external storage component 1310 (S2011).

Upon receiving the data from the type conversion management unit 304, the external storage component 1310 executes processing of the specified operation name on the data using the parameter information (S2012).

That is, the external storage component 1310 transmits, to the external storage system 40, a request (acquisition request) for the file list stored in the folder of "folder2". Accordingly, the file list is transmitted from the external storage system 40. When the file list is transmitted from the external storage system 40, the external storage component 1310 transmits the file list as data to the flow execution unit 301.

Through this, execution of the series of processes (processing flow) based on the processing flow information 1100 illustrated in FIG. 8A is completed, and the file list stored in the folder selected by the user is acquired from the external storage system 40.

Figure 21:
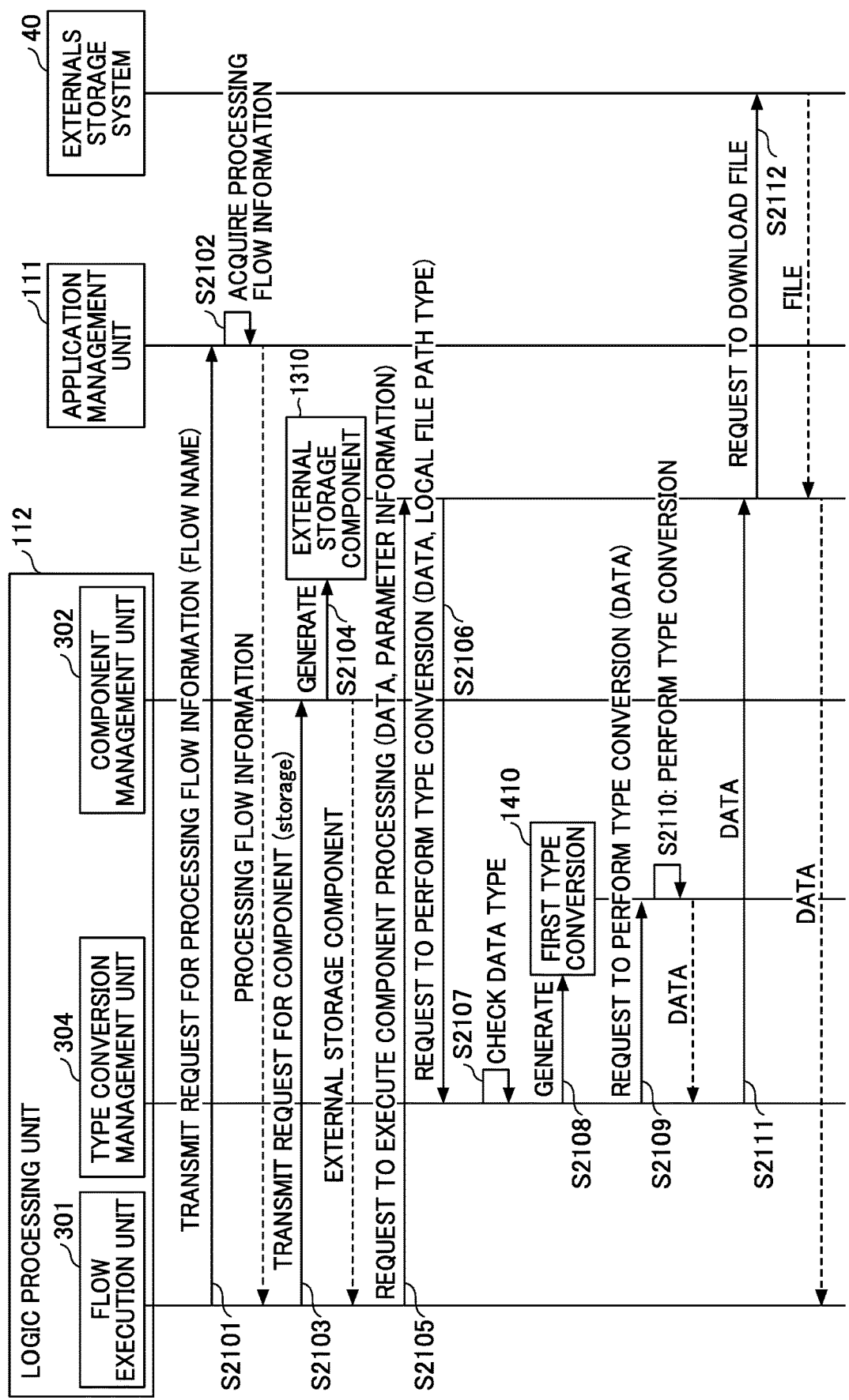
FIG. 21 is a sequence diagram illustrating an example of the process of executing a file download flow according to the exemplary embodiment.

A detailed description is given below of a process of S1717 (process of executing file download flow) with reference to FIG. 21. FIG. 21 is a sequence diagram illustrating an example of the process of executing the file download flow.

Upon receiving the application execution request from the application execution unit 122, the flow execution unit 301 transmits a request (acquisition request) for processing flow to the application management unit 111 (S2101). The acquisition request includes the flow name of "storage-download".

Upon receiving the request for the processing flow, the application management unit 111 acquires the processing flow information 1100 of the flow name of "storage-download", which is included in the acquisition request, from the application information storage unit 150 (S2102). Then, the application management unit 111 transmits the processing flow information 1100 acquired from the application information storage unit 150 to the flow execution unit 301.

Here, in the following description, the application management unit 111 transmits the processing flow information 1100 illustrated in FIG. 8B to the flow execution unit 301, for example.

The flow execution unit 301, subsequently, transmits to the component management unit 302, a request for a component (component acquisition request) based on the process flow information 1100 (S2103).

That is, the flow execution unit 301 transmits, to the component management unit 302, the component acquisition request of the component name of "storage", which is defined in "component" included in the detailed processing definition 1110 of the processing flow information 1100 illustrated in FIG. 8B.

Upon receiving the component acquisition request, the component management unit 302 generates a component having the component name of "storage" (namely, external storage component 1310) (S2104). The external storage component 1310 may be generated by using the API for generating a component that is defined in the component common I/F 1300.

The component management unit 302 transmits the generated external storage component 1310 to the flow execution unit 301. That is, the component management unit 302 transmits, to the flow execution unit 301, an address on a memory such as the RAM 14, to which the external storage component 1310 is expanded.

Subsequently, the flow execution unit 301 transmits, to the external storage component 1310, a request to execute component processing (execution request) (S2105). The request to execute the component processing includes data and parameter information. In the request to execute the component processing the operation name of "downloadFile" of operation, is designated, for example, and "downloadFile" requests the external storage component 1310 to operate.

In response to receiving the request to execute the component processing, the external storage component 1310 transmits a request to perform type conversion to the type conversion management unit 304 (S2106). The request to perform the type conversion includes data and a designation of "LocalFilePath" indicating a data type that the external storage component 1310 supports.

Upon receiving the request to perform the type conversion, the type conversion management unit 304 checks whether or not the data type of the data included in the type conversion request matches the data type designated (S2107).

Here, the data type of the data included in the request to perform the type conversion is "InputStream", while the designated data type is "LocalFilePath". Accordingly, the type conversion management unit 304 determines that the data type of the data, which is included in the request to perform the type conversion does not match the designated data type.

Then, the type conversion management unit 304 refers to the type conversion information table 4000 and specifies type conversion for converting the data type "InputStream" into "LocalFilePath" (here, the first type conversion 1410 is specified). Subsequently, the type conversion management unit 304 generates the specified first type conversion 1410 (S2108). The first type conversion 1410 may be generated by using the type conversion common I/F 1400.

Subsequently, the type conversion management unit 304 transmits a request to perform the type conversion to the first type conversion 1410 (S2109). Additionally, the request to perform the type conversion includes data.

Upon receiving the request to perform the type conversion, the first type conversion 1410 performs the type conversion to convert the data type of the data, which is included in the request to perform the type conversion, from "InputStream" to "LocalFilePath" (S2010). Then, the first type conversion 1410 transmits, to the type conversion management unit 304, the data of which the data type is converted.

Upon receiving the data from the first type conversion 1410, the type conversion management unit 304 transmits the data to the external storage component 1310 (S2111).

Upon receiving the data from the type conversion management unit 304, the external storage component 1310 executes the processing, which is specified with the operation name, on the data using the parameter information (S2112).

That is, the external storage component 1310 transmits a request to download the file of "File 2.pdf" to the external storage system 40. Accordingly, the file "File 2.pdf" is downloaded from the external storage system 40. When "File 2.pdf" is downloaded from the external storage system 40, the external storage component 1310 transmits the file to the flow execution unit 301 as data.

Through this, execution of the series of processes (processing flow) based on the processing flow information 1100 illustrated in FIG. 8B is completed, and the file selected by the user is downloaded from the external storage system 40.

Figure 22:
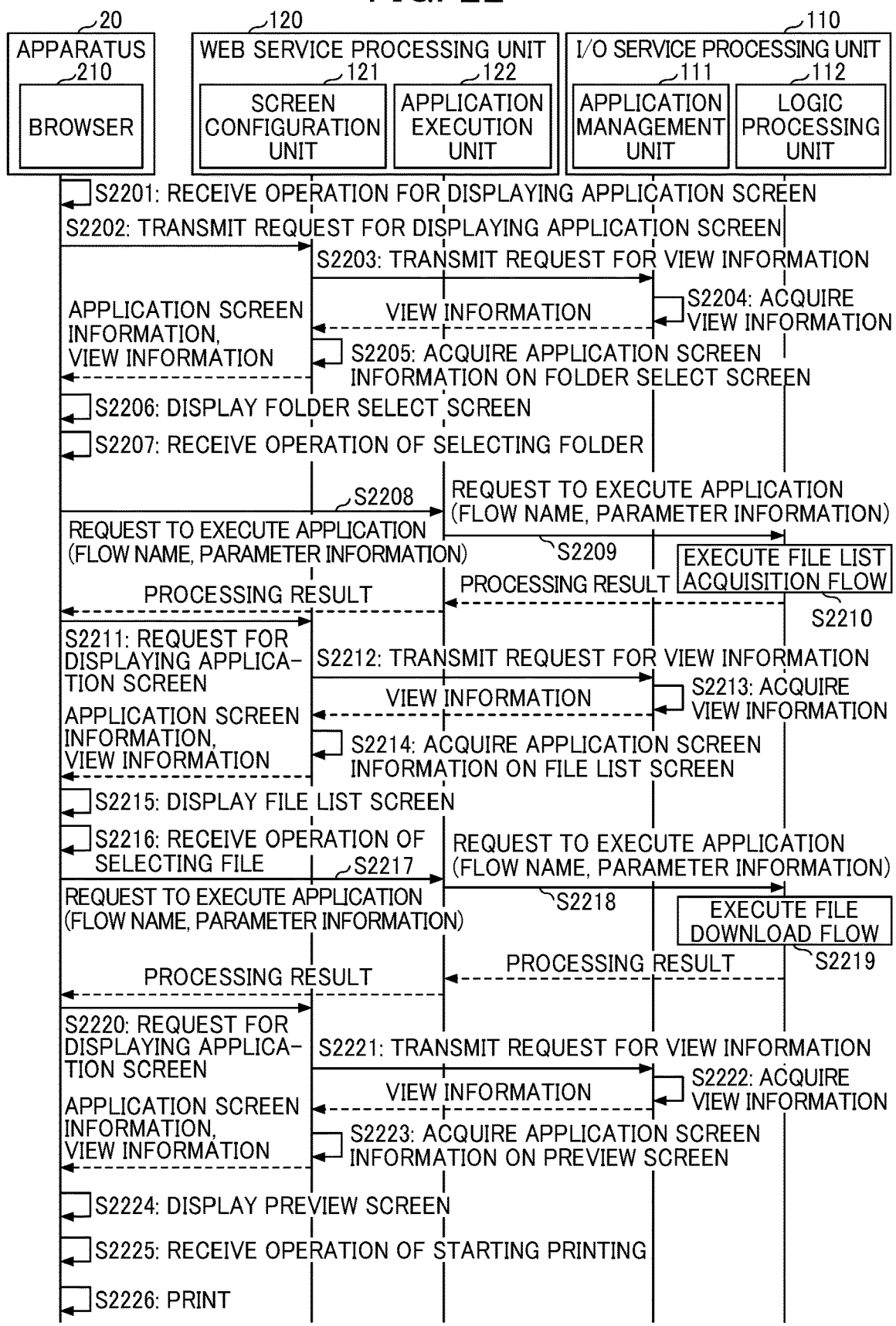
FIG. 22 is a sequence diagram illustrating another example of the entire process of using the external file printing service.

A description is given below of another process in which the user of the apparatus 20 uses the external file printing service with reference to FIG. 22. FIG. 22 is a sequence diagram illustrating another example of the entire process of using the external file printing service.

The browser 210 of the apparatus 20 receives an operation for displaying the application screen of the external file printing service, which is the same as S1701 of FIG. 17 (S2201).

Upon receiving the operation for displaying the application screen of the external file printing service, the browser 210 of the apparatus 20 transmits the request for displaying the application screen to the screen configuration unit 121 of the web service processing unit 120 (S2202). The request for displaying the application screen includes the application ID of the application information 1000, which provides the external file printing service.

The screen configuration unit 121 of the web service processing unit 120 transmits a request (acquisition request) for view information (view information acquisition request) to the application management unit 111 of the I/O service processing unit 110 in response to the request for displaying the application screen (S2203). The request for the view information includes the application ID of the application information 1000, which provides the external file printing service.

Upon receiving the request for the view information, the application management unit 111 of the I/O service processing unit 110 acquires the view information of the application configuration information 1200 stored in association with the application ID included in the acquisition request (S2204). That is, the application management unit 111 acquires the view information 1210 of the application configuration information 1200 illustrated in FIG. 16.

The application management unit 111, then, transmits the view information 1210 acquired from the application information storage unit 150 to the screen configuration unit 121. As described above, the application management unit 111 transmits the view information required to display the application screen by the browser 210.

Subsequently, the screen configuration unit 121 of the web service processing unit 120 acquires the application screen information 2000 on the folder select screen from the application screen information 2000 stored in association with the application ID from the application screen information storage unit 160 (S2205). The screen configuration unit 121 specifies the application screen information 2000 on the folder select screen based on "select-folder" defined in "layoutName" of the view information 1210 transmitted from the application management unit 111.

The screen configuration unit 121 transmits, to the browser 210, the application screen information 2000 acquired from the application screen information storage unit 160 and the view information 1210 transmitted in S2204, which is described above.

The subsequent process of S2206 to 52210 is the same as the process of S1706 to S1710 of FIG. 17, and the description of the subsequent process is omitted.

Upon receiving the processing result of the file list acquisition flow, the browser 210 of the apparatus 20 transmits a request for displaying a file list screen to the screen configuration unit 121 of the web service processing unit 120 (S2211).

The screen configuration unit 121 of the web service processing unit 120 transmits a request (acquisition request) for view information to the application management unit 111 of the I/O service processing unit 110 in response to the request for displaying the application screen (S2212). The request for the view information includes the application ID of the application information 1000, which provides the external file printing service.

Upon receiving the request for the view information, the application management unit 111 of the I/O service processing unit 110 acquires the application configuration information 1200 on the view information stored in association with the application ID, which is included in the acquisition request (S2213). That is, the application management unit 111 acquires the view information 1220 of the application configuration information 1200 illustrated in FIG. 16.

The application management unit 111, then, transmits the view information 1220 acquired from the application information storage unit 150 to the screen configuration unit 121. As described above, the application management unit 111 transmits the view information required to display the application screen by the browser 210.

Subsequently, the screen configuration unit 121 of the web service processing unit 120 acquires the application screen information 2000 on the folder select screen from the application screen information 2000 stored in association with the application ID from the application screen information storage unit 160 (S2214). The screen configuration unit 121 specifies the application screen information 2000 on the file list screen based on "one-column-list", which is defined in "layoutName" in the view information 1220 transmitted from the application management unit 111.

The screen configuration unit 121 transmits, to the browser 210, the application screen information 2000 acquired from the application screen information storage unit 160 and the view information 1220 transmitted in S2213, which is described above.

The subsequent process of S2215 to S2219 is the same as the process of S1713 to S1717 of FIG. 17, and the description of the subsequent process is omitted.

Upon receiving the processing result of the file download flow, the browser 210 of the apparatus 20 transmits a request to display the file list screen to the screen configuration unit 121 of the web service processing unit 120 (S2220).

The screen configuration unit 121 of the web service processing unit 120 transmits a request (acquisition request) for view information to the application management unit 111 of the I/O service processing unit 110 in response to the request for the application screen (S2221). The request for the view information includes the application ID of the application information 1000, which provides the external file printing service.

Upon receiving request for the view information, the application management unit 111 of the I/O service processing unit 110 acquires the view information of the application configuration information 1200 stored in association with the application ID included in the acquisition request (S2222). That is, the application management unit 111 acquires the view information 1230 of the application configuration information 1200 illustrated in FIG. 16.

The application management unit 111, then, transmits the view information 1220 acquired from the application information storage unit 150 to the screen configuration unit 121. As described above, the application management unit 111 transmits the view information required to display the application screen by the browser 210.

Subsequently, the screen configuration unit 121 of the web service processing unit 120 acquires the application screen information 2000 on the preview screen from the application screen information 2000 stored in association with the application ID from the application screen information storage unit 160 (S2223). The screen configuration unit 121 specifies the application screen information 2000 on the file list screen based on "preview", which is defined in "layoutName" included in the view information 1220 transmitted from the application management unit 111.

The screen configuration unit 121 transmits, to the browser 210, the application screen information 2000 acquired from the application screen information storage unit 160 and the view information 1230 transmitted in S2222, which is described above.

The subsequent process of S2224 to S2226 is the same as the process of S1720 to S1722 of FIG. 17, and the description of the subsequent process is omitted.

In this manner, in the service provision system 10 according to the present embodiment, the application management unit 111 acquires the view information required by the browser 210 to display the application screen and transmits the view information to the browser 210.

<Service Provided by Service Provision System>

As an example of other services than the external file printing service, brief overview of a bar code assignment service is described below. The bar code assignment service is a service of assigning a bar code to an electronic file generated by scanning and then uploading the electronic file to the external storage system 40.

Figure 23:
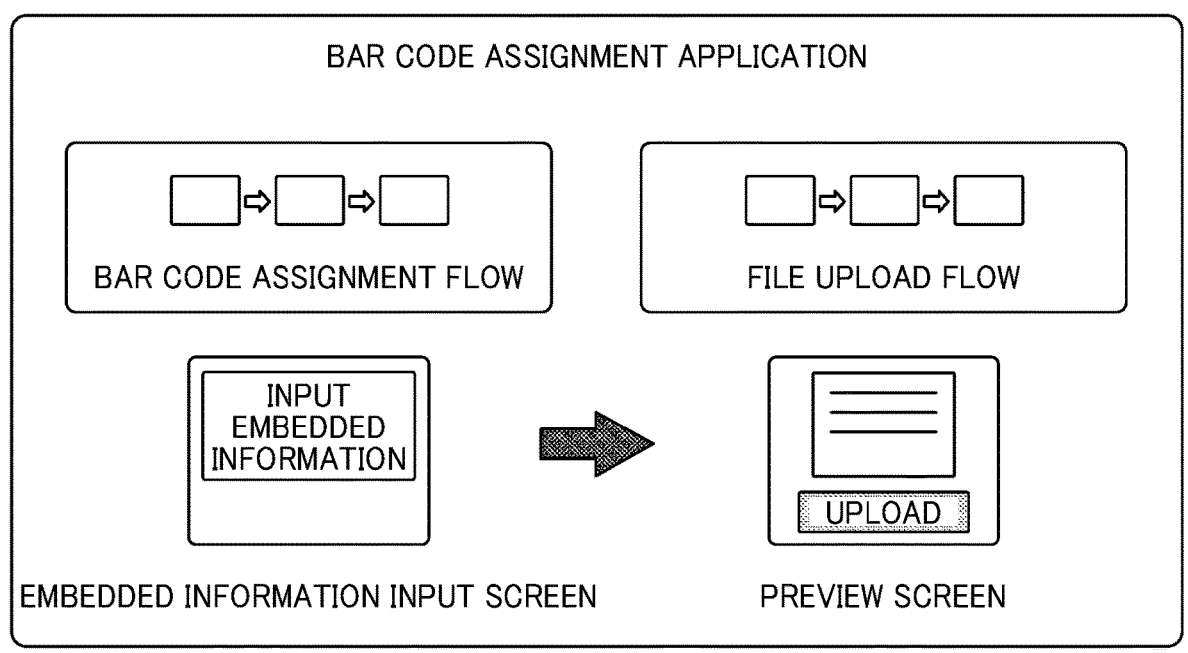
FIG. 23 is an illustration for schematically explaining a bar code assignment application according to the exemplary embodiment.

As illustrated in FIG. 23, an application (bar code assignment application) providing the bar code assignment service includes one or more application screens and one or more processing flows.

That is, in the bar code assignment application, an embedded information input screen used by the user for designating information to be embedded in a bar code and a processing flow (bar code assignment flow) for assigning the bar code to an electronic file generated by scanning are associated with each other. Additionally, in the bar code assignment application, a preview screen for displaying the electronic file to which the bar code is assigned and a processing flow (file upload flow) for uploading the electronic file to the external storage system 40 are associated with each other.

Figure 24:
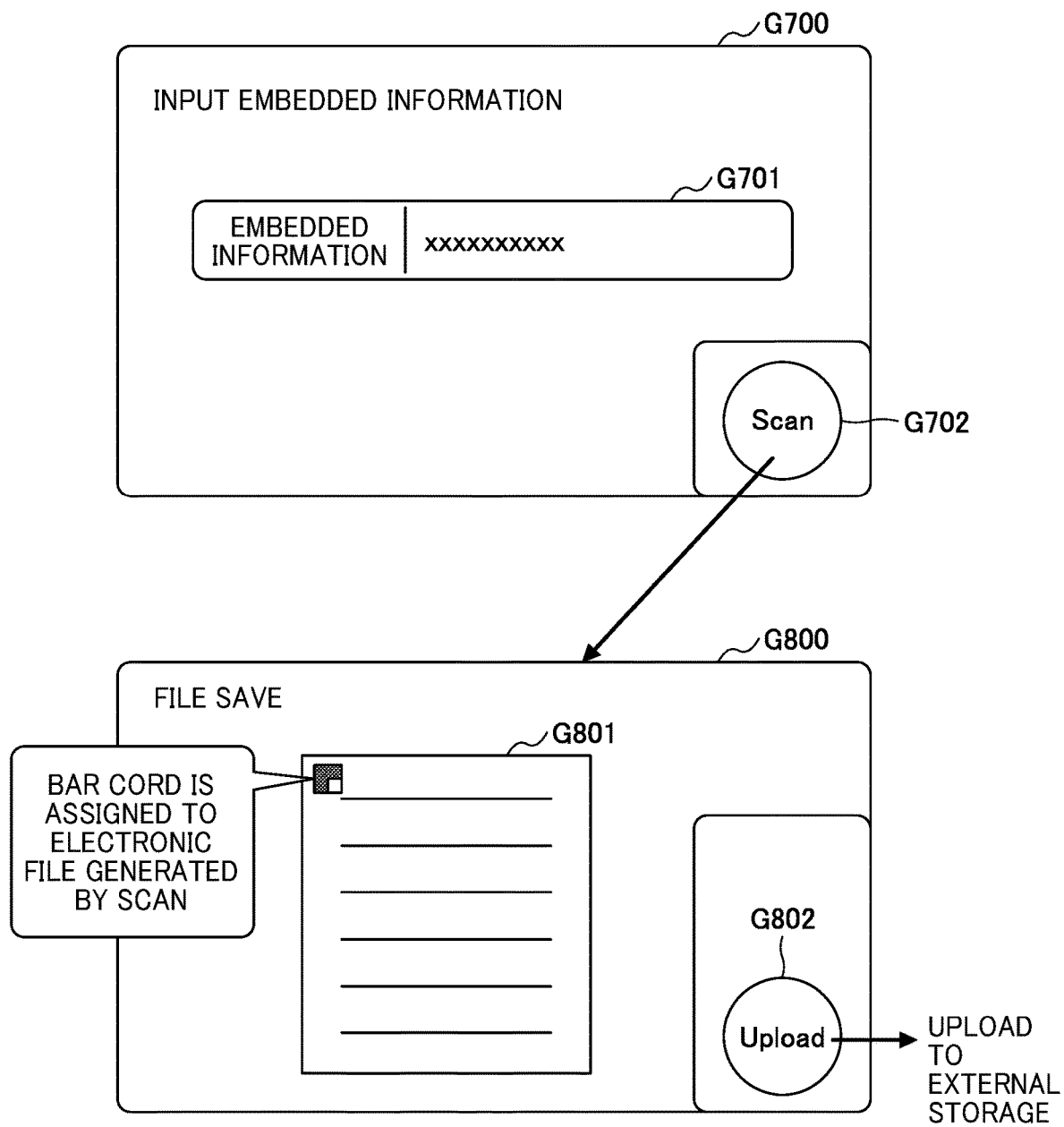
FIG. 24 is a screen transition of an application screen in the bar code assignment application.

As illustrated in FIG. 24, an embedded information input screen G700 includes an embedded information field G701 used by the user for designating embedded information. The user designates desired information with the embedded information field G701 and presses a scan button G702. Through this, the bar code assignment flow is executed and the bar code in which the information designated by the user is embedded is assigned to the electronic file, which is generated by scanning.

Additionally, as illustrated in FIG. 24, a preview screen G800 includes a preview display field G801 in which a preview of a content of the electronic file to which the bar code is assigned is displayed and includes an upload button G802 for uploading the electronic file. When the upload button G 802 is pressed by the user, the file upload flow is executed and the electronic file is uploaded to the external storage system 40.

As described above, the service provision system 10 according to the present embodiment provides the various services to the user of the apparatus 20 by using the applications each of which includes one or more application screen and one or more processing flows executable with a corresponding application screen.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing system including one or more information processing apparatuses, each of which is configured to perform a plurality of programs to implement functions, the information processing system comprising:
    a memory to store application information associating flow information with application configuration information identifying one of one or more applications, each of which performs, when executed, a series of processes using electronic data, wherein the flow information defines program identification information identifying one or more programs, each of which is executed to perform a process included in the series of processes, and an order of execution of the one or more programs, and wherein the application configuration information defines flow identification information identifying the corresponding flow information, and is associated with application screen information indicating one or more application usage screens used to perform the series of processes based on the flow information identified by the flow identification information; and
    circuitry configured to:
        receive, from one of a plurality of electronic apparatuses connected to the information processing system, a first request including application identification information identifying a particular application of the one or more applications stored in the memory;
        transmit one or more application usage screens to the one of the plurality of electronic apparatuses, wherein, the one or more application usage screens correspond to the application screen information indicating one or more application usage screens that is defined in the application configuration information on the particular application identified by the application identification information included in the first request received;
        receive a second request including the flow identification information corresponding to the application usage screen in response to execution of the series of processes on the application usage screen displayed by the one of the plurality of electronic apparatuses;
        acquire, from the memory, the flow information identified by the flow identification information included in the second request received; and
        execute the series of processes in which the one or more programs identified by the program identification information defined in the acquired flow information are executed in the order of execution defined in the flow information.

2. The information processing system of claim 1, wherein the circuitry is further configured to receive an application registration request including the application configuration information that is generated by another one of the plurality of electronic apparatuses, and
    the memory stores the application configuration information, which is included in the application registration request, in association with a plurality of pieces of the flow information, each of which is identified by a corresponding one of a plurality of pieces of the flow identification information defined in the application configuration information.

3. The information processing system of claim 1, wherein the application configuration information defines, in an order, a plurality of pieces of the flow identification information associated with the application screen information indicating one or more application usage screens, and
    the circuitry is further configured to transmit, when the series of processes is performed, to the one of the plurality of electronic apparatuses, an application screen based on the application screen information indicating one or more application usage screens, wherein the application screen corresponds to a first piece of the flow identification information, wherein the first piece of the flow identification information is next to a second piece of the flow identification information in the order, wherein each of the first piece of the flow identification information and the second piece of the flow identification information identifies one of the plurality of pieces of the flow information corresponding to the series of processes in the application configuration information.

4. The information processing system of claim 3, wherein the application screen information indicating one or more application usage screens is layout information indicating one or more layouts of respective one or more application usage screens,
    the application configuration information associates the first piece of the flow identification information with the layout information indicating one of the one or more layouts,
    the one of the one or more layouts allows input of a data format identical to the data format of a processing result in the series of processes based on the second piece of the flow information identified by the second piece of the flow identification information, and
    the second piece of the flow identification information is one before the first piece of the flow identification information in the order.

5. An information processing apparatus, comprising:
    a memory configured to store application information associating flow information with application configuration information identifying one of one or more applications, each of which performs, when executed, a series of processes using electronic data, wherein the flow information defines program identification information identifying one or more programs, each of which is executed to perform a process included in the series of processes, and an order of execution of the one or more programs, and wherein the application configuration information defines flow identification information identifying the corresponding flow information, and is associated with application screen information indicating one or more application usage screens used to perform the series of processes based on the flow information identified by the flow identification information; and circuitry configured to:

receive, from one of a plurality of electronic apparatuses connected to the information processing apparatus, a first request including application identification information identifying a particular application of the one or more applications stored in the memory;

transmit one or more application usage screen to the one of the plurality of electronic apparatuses, wherein, the one or more application usage screens correspond to the application screen information indicating one or more application usage screens that is defined in the application configuration information on the particular application identified by the application identification information included in the first request received;

receive a second request including the flow identification information corresponding to the application usage screen in response to execution of the series of processes on the application usage screen displayed by the one of the plurality of electronic apparatuses;

acquire, from the memory, the flow information identified by the flow identification information included in the second request received; and execute the series of processes in which the one or more programs identified by the program identification information defined in the acquired flow information are executed in the order of execution defined in the flow information.

6. An information processing method, comprising:

storing, in a memory, application information associating flow information with application configuration information identifying one of one or more applications, each of which performs, when executed, a series of processes using electronic data, wherein the flow information defines program identification information identifying one or more programs, each of which is executed to perform a process included in the series of processes, and an order of execution of the one or more programs, and wherein the application configuration information defines flow identification information identifying the corresponding flow information, and is associated with application screen information indicating one or more application usage screens used to perform the series of processes based on the flow information identified by the flow identification information;

receiving, from one of a plurality of electronic apparatuses connected to an information processing system, a first request including application identification information identifying a particular application of the one or more applications stored in the memory;

transmitting one or more application usage screens to the one of the plurality of electronic apparatuses, wherein the one or more application usage screens correspond to the application screen information indicating one or more application usage screens that is defined in the application configuration information on the particular application identified by the application identification information included in the first request received, receiving a second request including the flow identification information corresponding to the application usage screen in response to execution of the series of processes on the application usage screen displayed by the one of the plurality of electronic apparatuses;

acquiring, from the memory, the flow information identified by the flow identification information included in the second request received, and executing the series of processes in which the one or more programs identified by the program identification information defined in the acquired flow information are executed in the order of execution defined in the flow information.

* * * * *